United States Patent
Kim et al.

(10) Patent No.: US 11,768,350 B2
(45) Date of Patent: Sep. 26, 2023

(54) OPTICAL IMAGING SYSTEM AND PORTABLE ELECTRONIC DEVICE

(71) Applicant: SAMSUNG ELECTRO-MECHANICS CO., LTD., Suwon-si (KR)

(72) Inventors: Hag Chul Kim, Suwon-si (KR); Yong Joo Jo, Suwon-si (KR); Che Young Lim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/977,209

(22) Filed: Oct. 31, 2022

(65) Prior Publication Data

US 2023/0062424 A1   Mar. 2, 2023

Related U.S. Application Data

(63) Continuation of application No. 17/004,254, filed on Aug. 27, 2020.

(30) Foreign Application Priority Data

Aug. 30, 2019 (KR) .................. 10-2019-0107271

(51) Int. Cl.
   *G02B 9/34*   (2006.01)
   *G02B 13/00*  (2006.01)

(52) U.S. Cl.
   CPC ............ *G02B 9/34* (2013.01); *G02B 13/004* (2013.01); *G02B 13/0065* (2013.01)

(58) Field of Classification Search
   CPC ..... G02B 9/34; G02B 13/004; G02B 13/0065
   See application file for complete search history.

(56) References Cited

U.S. PATENT DOCUMENTS

| | | | |
|---|---|---|---|
| 7,206,143 B2 | 4/2007 | Kamo et al. |
| 7,403,344 B2 | 7/2008 | Xu et al. |
| 9,529,180 B2 | 12/2016 | Huang et al. |
| 9,869,846 B1 | 1/2018 | Bone et al. |
| 10,139,594 B2 | 11/2018 | Lin et al. |
| 2004/0240052 A1 | 12/2004 | Minefuji et al. |
| 2008/0106800 A1 | 5/2008 | Shin |
| 2009/0059392 A1 | 3/2009 | Sano |

(Continued)

FOREIGN PATENT DOCUMENTS

| CN | 1574894 A | 2/2005 |
|---|---|---|
| CN | 101377564 A | 3/2009 |

(Continued)

OTHER PUBLICATIONS

Taiwanese Office Action dated May 5, 2021 issued in counterpart Taiwanese Patent Application No. 109129582 (5 pages in English) (4 pages in Taiwanese).

(Continued)

*Primary Examiner* — Joseph P Martinez
(74) *Attorney, Agent, or Firm* — NSIP Law

(57) ABSTRACT

An optical imaging system includes a first lens, a second lens, a third lens, and a fourth lens disposed in order from an object side. The optical imaging system satisfies 4.0<f/IMG_HT<5.0, where f is a focal length of the optical imaging system, and IMG_HT is one-half of a diagonal length of an imaging plane.

16 Claims, 19 Drawing Sheets

(56) References Cited

U.S. PATENT DOCUMENTS

| | | |
|---|---|---|
| 2012/0099014 A1 | 4/2012 | Huang et al. |
| 2012/0293876 A1 | 11/2012 | Tsai |
| 2014/0192253 A1 | 7/2014 | Laroia |
| 2014/0285908 A1 | 9/2014 | Hsu et al. |
| 2015/0212287 A1 | 7/2015 | Chen et al. |
| 2016/0291288 A1 | 10/2016 | Huang |
| 2017/0108670 A1 | 4/2017 | Ko |
| 2018/0017767 A1 | 1/2018 | Chen |
| 2018/0024314 A1 | 1/2018 | Tashiro |
| 2018/0095244 A1 | 4/2018 | Lin et al. |
| 2018/0143403 A1* | 5/2018 | Tseng ................ G02B 13/0065 |
| 2018/0364455 A1 | 12/2018 | Chen et al. |
| 2019/0056566 A1 | 2/2019 | Yoo et al. |
| 2019/0086636 A1 | 3/2019 | Fukaya |
| 2019/0212529 A1 | 7/2019 | Ko |
| 2020/0409066 A1 | 12/2020 | Hsieh et al. |

FOREIGN PATENT DOCUMENTS

| | | |
|---|---|---|
| CN | 107884906 A | 4/2018 |
| CN | 106154507 B | 10/2018 |
| KR | 10-0800811 B1 | 2/2008 |
| KR | 10-2019-0020421 A | 3/2019 |
| KR | 10-2019-0088715 A | 7/2019 |
| TW | 201217851 A1 | 5/2012 |
| TW | 201248239 A1 | 12/2012 |
| TW | 201341838 A | 10/2013 |
| TW | 201523016 A | 6/2015 |
| TW | 201715270 A | 5/2017 |
| TW | 1607234 B | 12/2017 |
| TW | 202113419 A | 4/2021 |

OTHER PUBLICATIONS

Notice of Reason for Rejection dated Nov. 19, 2021, in counterpart Korean Patent Application No. 10-2020-0109414 (11 pages in English and 8 pages in Korean).

Taiwanese Office Action dated Mar. 25, 2022, in counterpart Taiwanese Patent Application No. 110145488 (12 pages in English and 14 pages in Mandarin).

Taiwanese Office Action dated Jun. 15, 2022 in counterpart Taiwanese Patent Application No. 110145488 (6 pages in English, 7 pages in Mandarin).

Korean Office Action dated May 18, 2022, in counterpart Korean Patent Application No. 10-2020-0109414 (10 pages in English and 6 pages in Korean).

Chinese Office Action dated Sep. 5, 2022, in counterpart Chinese Patent Application No. 202010885074.3 (6 Pages in English, 7 Pages in Chinese).

Final Office Action dated Jan. 4, 2023, in related U.S. Appl. No. 17/004,254 (15 pages in English).

* cited by examiner

OPTICAL IMAGING SYSTEM AND PORTABLE ELECTRONIC DEVICE

CROSS-REFERENCE TO RELATED APPLICATION(S)

This application is a continuation of U.S. application Ser. No. 17/004,254 filed on Aug. 27, 2020, which claims the benefit under 35 USC 119(a) of Korean Patent Application No. 10-2019-0107271 filed on Aug. 30, 2019 in the Korean Intellectual Property Office, the entire disclosures of which are incorporated herein by reference for all purposes.

BACKGROUND

1. Field

The following description relates to an optical imaging system configured to fold an optical path.

2. Description of Related Art

In a collapsible optical imaging system in which a plurality of lenses is arranged linearly, a focal length of the optical system may increase when the number of lenses increases. For example, it may be difficult to reduce a size of an optical imaging system including four or more lenses. For this reason, there may be a limitation in mounting a collapsible optical imaging system having a relatively long focal length on a portable terminal device having a reduced thickness.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An optical imaging system which may have a relatively long focal length and may be mountable on a small-sized terminal device having a reduced thickness.

In one general aspect, an optical imaging system includes a first lens, a second lens, a third lens, and a fourth lens disposed in order from an object side. The optical imaging system satisfies $4.0<f/IMG\_HT<5.0$, where f is a focal length of the optical imaging system, and IMG_HT is one-half of a diagonal length of an imaging plane.

The optical imaging system may satisfy $0.10<L2R2/f<1.0$, where L2R2 is a radius of curvature of an image-side surface of the second lens.

The optical imaging system may satisfy $0.10<(L2R1+L2R2)/(L2R1-L2R2)<1.0$, where L2R1 is a radius of curvature of an object-side surface of the second lens, and L2R2 is a radius of curvature of an image-side surface of the second lens.

The optical imaging system may satisfy $1.0<f/f1<5.0$, $-5.0<f/f2<-1.0$, $-1.0<f/f3<3.0$, and $-5.0<f/f4<5.0$, where f1 is a focal length of the first lens, f2 is a focal length of the second lens, f3 is a focal length of the third lens, and f4 is a focal length of the fourth lens.

The optical imaging system may include a first prism disposed on an object side of the first lens.

The optical imaging system may satisfy $11 \text{ mm}<PTTL<15 \text{ mm}$, where PTTL is a distance from a reflective surface of the first prism to the imaging plane.

The optical imaging system may satisfy $1.0 \text{ mm}<DPL1<1.2 \text{ mm}$, where DPL1 is a distance from an image-side surface of the first prism to an object-side surface of the first lens.

The optical imaging system may satisfy $1.0<PTTL/f<2.0$, where PTTL is a distance from the reflective surface of the first prism to the imaging plane.

The optical imaging system may include a second prism disposed between the fourth lens and the imaging plane.

In another general aspect, an optical imaging system includes a first prism configured to emit light incident along a first optical axis in a direction of a second optical axis intersecting the first optical axis; a first lens having a convex image-side surface; a second lens having a concave image-side surface; a third lens having refractive power; and a fourth lens having a convex object-side surface. The first prism, the first lens, the second lens, the third lens, and the fourth lens are disposed in order in the direction of the second optical axis. The optical imaging system satisfies $1.0<PTTL/f<2.0$, where PTTL is a distance from a reflective surface of the first prism to an imaging plane, and f is a focal length of the optical imaging system.

The optical imaging system may satisfy $4.0<f/IMG\_HT<5.0$, where f is a focal length of the optical imaging system, and IMG_HT is one-half of a diagonal length of the imaging plane.

The first lens may have a convex object-side surface.

The second lens may have a concave object-side surface.

The third lens may have a convex object-side surface or a convex image-side surface.

The optical imaging system may satisfy $0.10<L2R2/f<1.0$, where L2R2 is a radius of curvature of an image-side surface of the second lens.

A portable electronic device may include three or more camera modules, wherein an optical axis of a first camera module is formed in a different direction from an optical axis of a second camera module and an optical axis of a third camera module, and the image sensor may be configured to convert light incident through the first to fifth lenses to an electrical signal.

The first camera module may have the narrowest angle of view and the longest focal length, the third camera module may have the widest angle of view and the shortest focal length, and the second camera module may have a wider angle of view than the first camera module and a narrower angle of view than the third camera module.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
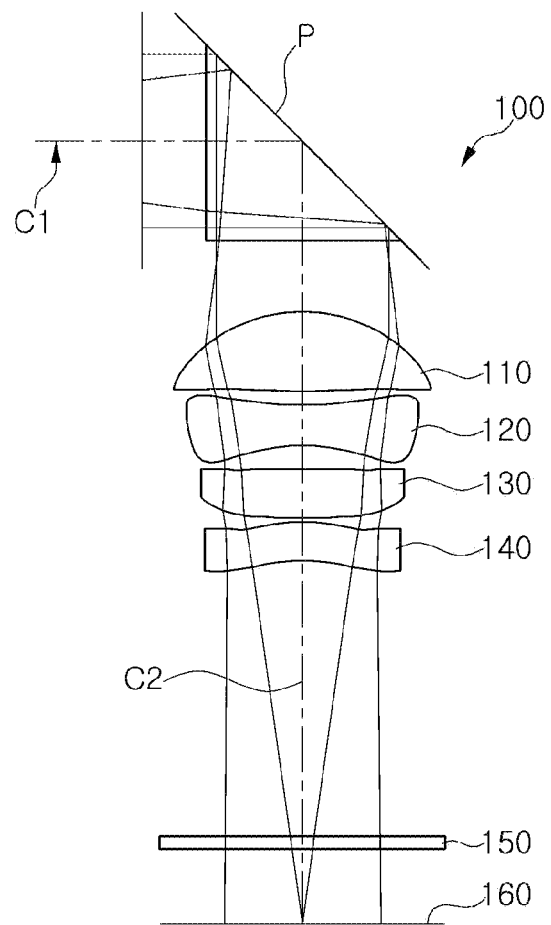
FIG. 1 is a diagram illustrating a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the examples, a first lens refers to a lens most adjacent to an object (or a subject), and a fourth lens refers to a lens most adjacent to an imaging plane (or an image sensor). In the examples, a unit of a radius of curvature, a thickness, a TTL, an IMG_HT (½ of a diagonal length of an imaging plane), and a focal length are indicated in millimeters (mm). A thickness of a lens, a gap between lenses, and a TTL refer to a distance of a lens in an optical axis. Also, in the descriptions of a shape of a lens, the configuration in which one surface is convex indicates that an optical axis region of the surface is convex, and the configuration in which one surface is concave indicates that an optical axis region of the surface is concave. Thus, even when it is described that one surface of a lens is convex, an edge of the lens may be concave. Similarly, even when it is described that one surface of a lens is concave, an edge of the lens may be convex.

The optical imaging system includes an optical system including a plurality of lenses. For example, the optical system of the optical imaging system may include a plurality of lenses having refractive power. However, the optical imaging system does not only include lenses having refractive power. For example, the optical imaging system may include a prism for refracting incident light and a stop for adjusting the amount of light. The optical imaging system may also include an infrared cut-off filter for blocking infrared rays. The optical imaging system may further include an image sensor (an imaging device) configured to convert an image of a subject incident through the optical system into an electrical signal. The optical imaging system may further include a gap maintaining member for adjusting a distance between lenses.

The plurality of lenses may be formed of a material having a refractive index different from that of air. For example, the plurality of lenses may be formed of a plastic or glass material. At least one of the plurality of lenses may have an aspherical shape. An aspherical surface of the lens may be represented by equation 1 as below.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$ [Equation 1]

In equation 1, "c" is an inverse of a radius of a curvature of a respective lens, "k" is a conic constant, "r" is a distance from a certain point on an aspherical surface of the lens to an optical axis, "A to J" are aspheric constants, "Z" (or SAG) is a height from a certain point on an aspherical surface of the lens to an apex of the aspherical surface in an optical axis direction.

The optical imaging system may include four or more lenses. For example, the optical imaging system may include a first lens, a second lens, a third lens, and a fourth lens disposed in order from an object side.

The first to fourth lenses may be disposed with a gap between adjacent lenses. For example, an image-side surface of the first lens may not be in contact with an object-side surface of the second lens, and an image-side surface of the second lens may not be in contact with an object-side surface of the third lens.

The first lens has a certain refractive power. For example, the first lens may have positive refractive power. At least one surface of the first lens may be convex. For example, an object-side surface and an image-side surface of the first lens may be convex. The first lens may have a certain refractive index. For example, the first lens may have a refractive index equal to or higher than 1.5 and equal to or lower than 1.6. The first lens may have a certain focal length. For example, a focal length of the first lens may be determined within a range of 3.4 to 5.0 mm.

The second lens may have a certain refractive power. For example, the second lens may have negative refractive power. At least one surface of the second lens may be concave. For example, an object-side surface and an image-side surface of the second lens may be concave. The second lens may have a certain refractive index. For example, the second lens may have a refractive index equal to or higher than 1.6 and equal to or lower than 2.0.

The third lens may have a certain refractive power. For example, the third lens may have positive refractive power or negative refractive power. One surface of the third lens may be convex. For example, an object-side surface or an image-side surface of the third lens may be concave. The third lens may have a certain refractive index. For example, the third lens may have a refractive index higher than that of the second lens.

The fourth lens may have a certain refractive power. For example, the fourth lens may have positive refractive power or negative refractive power. One surface of the fourth lens may be convex. For example, an image-side surface of the fourth lens may be concave. The fourth lens may have a certain refractive index. For example, the fourth lens may have a refractive index lower than that of the third lens.

An effective diameter of one or more of the first to fourth lenses in a first direction intersecting an optical axis may have a shape different from that of an effective diameter in a second direction. For example, an effective diameter of the first lens in a horizontal direction may be different from an effective diameter of the first lens in a vertical direction.

The optical imaging system may include a lens formed of a plastic material. For example, in the optical imaging system, at least one of the four or more lenses included in a lens group may be formed of a plastic material.

The optical imaging system may include an aspherical lens. For example, in the optical imaging system, at least one of the four or more lenses included in a lens group may be configured as an aspherical lens.

The optical imaging system may include a member configured to fold or refract an optical path. For example, the optical imaging system may include a prism. The prism may be disposed on an object-side of the first lens. The prism may be formed of a material having a relatively low Abbe number. For example, a material of the prism may be selected from among materials having an Abbe number of 25 or lower.

The optical imaging system may include a filter, a stop, and an image sensor.

The filter may be disposed between the fourth lens and the image sensor. The filter may improve resolution of the optical imaging system by partially blocking a wavelength of incident light. For example, the filter may block an infrared wavelength of incident light. The stop may be disposed between the second lens and the third lens.

The optical imaging system may include a gap maintaining member.

The gap maintaining member may be disposed between lenses. For example, the gap maintaining member may be disposed between the first lens and the second lens. A hole may be formed in a central portion of the gap maintaining member. The hole may have a shape having a major axis and a minor axis. For example, the hole may have an oval shape, a rectangular shape with rounded corners, or the like. A length of a minor axis of the hole may have a size of 0.7 or higher and less than 1.0 as compared to a length of a major axis of the hole.

The optical imaging system may satisfy one or more of conditional equations below.

| | |
|---|---|
| 0.1<L2R2/f<1.0 | [Conditional Equation] |
| 0.1<(L2R1+L2R2)/(L2R1−L2R2)<1.0 | [Conditional Equation] |
| −5.0<L3R2/f<5.0 | [Conditional Equation] |
| −10<(L3R1+L3R2)/(L3R1−L3R2)<10 | [Conditional Equation] |

$1.0 < f/f1 < 5.0$ [Conditional Equation]

$-5.0 < f/f2 < -1.0$ [Conditional Equation]

$-1.0 < f/f3 < 3.0$ [Conditional Equation]

$-5.0 < f/f4 < 5.0$ [Conditional Equation]

$-1.0 < Nd1 - Nd2 < 0$ [Conditional Equation]

In the conditional equations, "L2R1" may be a radius of curvature of an object-side surface of the second lens, "L2R2" may be a radius of curvature of an image-side surface of the second lens, "L3R1" may be a radius of curvature of an object-side surface of the third lens, "L3R2" may be a radius of curvature of an image-side surface of the third lens, "f" may be a focal length of the optical imaging system, "f1" is a focal length of the first lens, "f2" is a focal length of the second lens, "f3" is a focal length of the third lens, "f4" is focal length of the fourth lens, "Nd1" may be a refractive index of the first lens, and "Nd2" may be a refractive index of the second lens.

In addition, the optical imaging system may satisfy one or more of conditional equations below.

$4.0 < f/\text{IMG\_HT} < 5.0$ [Conditional Equation]

$0.65 < L1S1es/L1S1el < 1.0$ [Conditional Equation]

$0.65 < L1S2es/L1S2el < 1.0$ [Conditional Equation]

$0.65 < L2S1es/L2S1el < 1.0$ [Conditional Equation]

$0.65 < L2S2es/L2S2el < 1.0$ [Conditional Equation]

$1.0 \text{ mm} < DPL1 < 1.2 \text{ mm}$ [Conditional Equation]

$11 \text{ mm} < PTTL < 15 \text{ mm}$ [Conditional Equation]

$0.65 < SPY2/SPX2 < 1.0$ [Conditional Equation]

$0.7 < L1S1el/\text{IMG\_HT} < 0.9$ [Conditional Equation]

$0.10 < L1S1el/PTTL < 0.15$ [Conditional Equation]

$0.08 < L1S1es/PTTL < 0.11$ [Conditional Equation]

$0.09 < L2S1el/PTTL < 0.14$ [Conditional Equation]

$0.07 < L2S1es/PTTL < 0.10$ [Conditional Equation]

$0.03 < AL1/(PTTL)^2 < 0.06$ [Conditional Equation]

$80° < 2\theta < 92°$ [Conditional Equation]

$3.0 < 2\theta/FOV < 5.0$ [Conditional Equation]

$1.0 < BFL/2\text{IMG\_HT} < 1.5$ [Conditional Equation]

$1.0 < PTTL/f < 2.0$ [Conditional Equation]

In the conditional equations, "L1S1es" may be a minor-axis effective radius of an object-side surface of the first lens, "L1S1el" may be a major-axis effective radius of the object-side surface of the first lens, "L1S2es" may be a minor-axis effective radius of an image-side surface of the first lens, "L1S2el" may be a major-axis effective radius of the image-side surface of the first lens, "L2S1es" may be a minor-axis effective radius of an object-side surface of the second lens, "L2S1el" may be a major-axis effective radius of the object-side surface of the second lens, "L2S2es" may be a minor-axis effective radius of an image-side surface of the second lens, "L2S2el" may be a major-axis effective radius of the image-side surface of the second lens, "DPL1" may be a distance from an image-side surface of the prism to the object-side surface of the first lens, "PTTL" may be a distance from a reflective surface of the prism to an imaging plane, "SPY2" may be a length of the hole formed in the gap maintaining member in a minor axis direction, "SPX2" may be a length of the hole formed in the gap maintaining member in a major axis direction, "AL1" may be an area of an effective diameter of the first lens (an object-side surface) projected on an imaging plane, "$2\theta$" may be an angle formed by an a center of an optical axis of a lens and both ends of a linear portion of an effective diameter of a lens, "FOV" may be a field of view of the optical imaging system, and "BFL" may be a distance from an image-side surface of the lens disposed most adjacent to an imaging plane to the imaging plane.

In the description below, various examples of the optical imaging system will be described.

Figure 2:
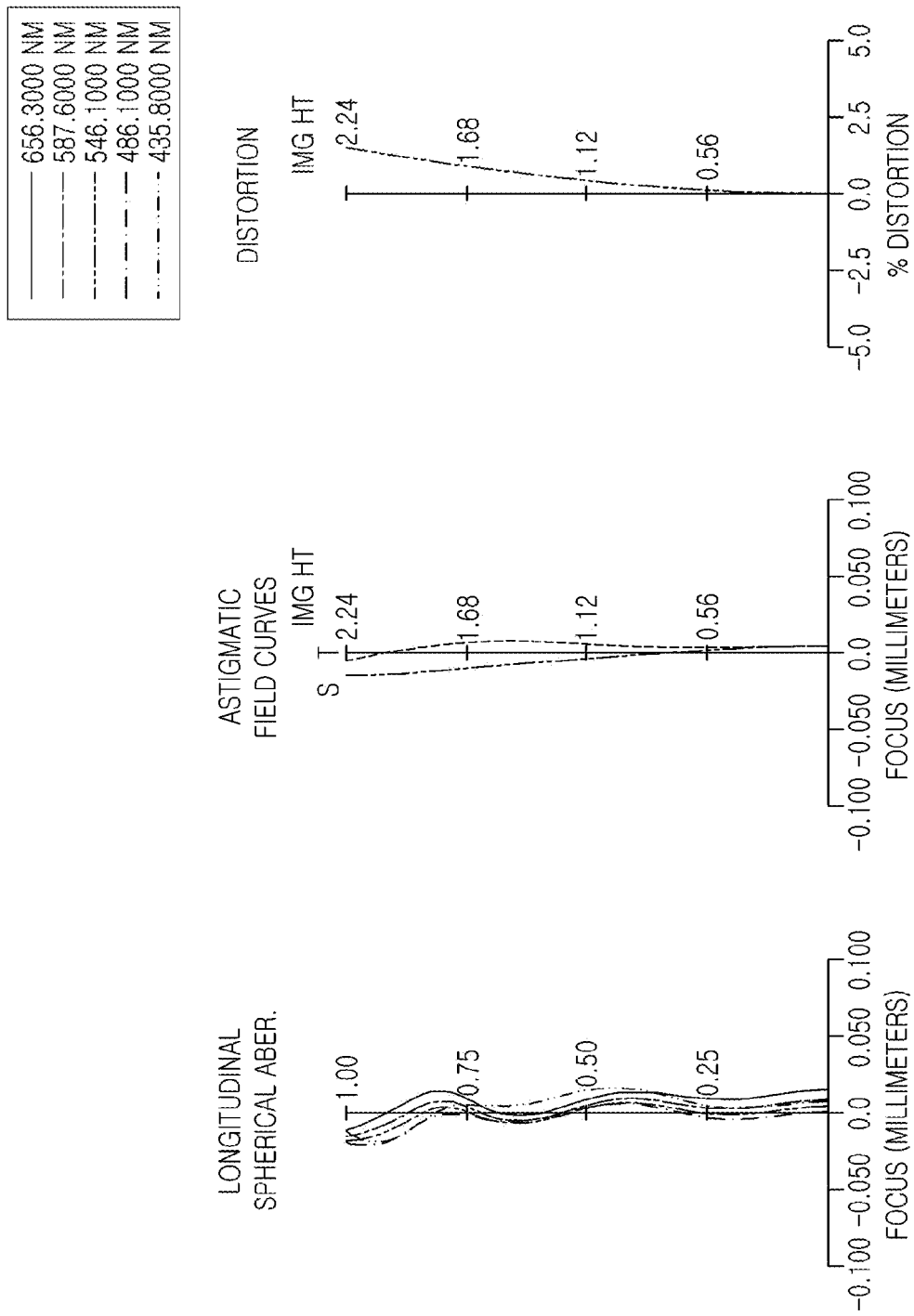
FIG. 2 shows aberration curves of the optical imaging system illustrated in FIG. 1.

A first example of the optical imaging system will be described with reference to FIGS. 1 and 2.

An optical imaging system 100 may include a prism P, a first lens 110, a second lens 120, a third lens 130, and a fourth lens 140.

The first lens 110 may have positive refractive power, and may have a convex object-side surface and a convex image-side surface. The second lens 120 may have negative refractive power, and may have a concave object-side surface and a concave image-side surface. The third lens 130 may have positive refractive power, and may have a convex object-side surface and a concave image-side surface. The fourth lens 140 may have positive refractive power, and may have a convex object-side surface and a concave image-side surface.

The optical imaging system 100 may include the prism P, a filter 150, and an image sensor 160.

The optical imaging system 100 may include the prism P as a mechanism for folding or refracting an optical path. The prism P may fold light incident in a direction of a first optical axis C1 in a direction of a second optical axis C2. The second optical axis C2 refracted by the prism P may be almost perpendicular to the first optical axis C1. The prism P may be disposed on an object side of the first lens 110. The prism P disposed as above may refract light reflected from an object (a subject) to the image sensor 160.

The filter 150 may be disposed in front of the image sensor 160 and may block infrared rays, or the like, included in incident light. The image sensor 160 may include a plurality of optical sensors. The image sensor 160 may be configured to convert an optical signal into an electrical signal.

Table 1 lists characteristics of the lenses of the optical imaging system 100, and Table 2 lists aspherical values of the optical imaging system 100. FIG. 2 shows aberration curves of the optical imaging system 100.

TABLE 1

| Surface No. | Note | Radius of Curvature | Thickness/ Gap | Focal Length | Refractive Index | Abbe Number |
|---|---|---|---|---|---|---|
| 1 | Prism | infinity | 1.6180 | | 1.63490 | 23.90000 |
| 2 | | infinity | 1.6180 | | 1.63490 | 23.90000 |
| 3 | | infinity | 1.1326 | | | |
| 4* | First | 2.6732 | 1.6500 | 4.1099 | 1.53500 | 56.00000 |
| 5* | Lens | −9.9574 | 0.0553 | | | |
| 6* | Second | −28.9155 | 0.6289 | −2.8694 | 1.61500 | 25.90000 |
| 7* | Lens | 1.9134 | 0.3819 | | | |
| 8 | Third | 5.9194 | 0.9500 | 27.4657 | 1.67140 | 19.20000 |
| 9* | Lens | 8.1097 | 0.1500 | | | |
| 10* | Fourth | 1.9845 | 0.6587 | 9.0000 | 1.61500 | 25.90000 |
| 11* | Lens | 2.6870 | 3.9966 | | | |
| 12* | Filter | infinity | 0.2427 | | 1.54410 | 56.00000 |
| 13* | | infinity | 1.0502 | | | |
| 14 | Imaging Plane | infinity | −0.0045 | | | |

TABLE 2

| Surface No. | 4 | 5 | 6 | 7 | 8 | 9 | 10 | 11 |
|---|---|---|---|---|---|---|---|---|
| K | −1.77E−01 | 3.53E+01 | 5.06E+01 | 2.95E−01 | 1.95E+01 | 3.13E+01 | −1.91E+00 | 1.97E+00 |
| A | 8.25E−04 | 1.27E−02 | −3.85E−02 | −7.33E−02 | 3.11E−02 | 1.91E−02 | −2.30E−02 | −4.77E−02 |
| B | −1.28E−03 | −3.92E−03 | 2.52E−02 | 4.57E−02 | −2.67E−02 | −4.47E−03 | 5.09E−03 | −6.00E−03 |
| C | 2.18E−03 | −6.50E−03 | −3.05E−03 | −1.21E−02 | 2.69E−02 | −6.41E−03 | −8.91E−04 | 1.32E−02 |
| D | −3.25E−03 | 1.88E−02 | 3.11E−04 | 7.20E−03 | −1.51E−02 | 1.83E−02 | 4.56E−03 | −2.11E−02 |
| E | 2.21E−03 | −1.85E−02 | 6.92E−04 | −2.18E−03 | 1.85E−03 | −9.51E−03 | −5.12E−03 | 1.58E−02 |
| F | −7.47E−04 | 1.27E−02 | −3.71E−04 | 2.82E−03 | 0 | −8.56E−03 | 1.76E−03 | −4.42E−03 |
| G | 8.08E−05 | −6.17E−03 | −1.80E−04 | −6.57E−03 | 0 | 6.59E−03 | 3.33E−04 | 2.49E−12 |
| H | 1.58E−05 | 1.62E−03 | −4.14E−05 | 2.79E−03 | 0 | 2.47E−15 | 0.00E+00 | −2.12E−15 |
| J | −3.64E−06 | −1.64E−04 | 4.13E−05 | 9.37E−14 | 0 | 1.22E−15 | 0.00E+00 | 1.89E−15 |

Figure 3:
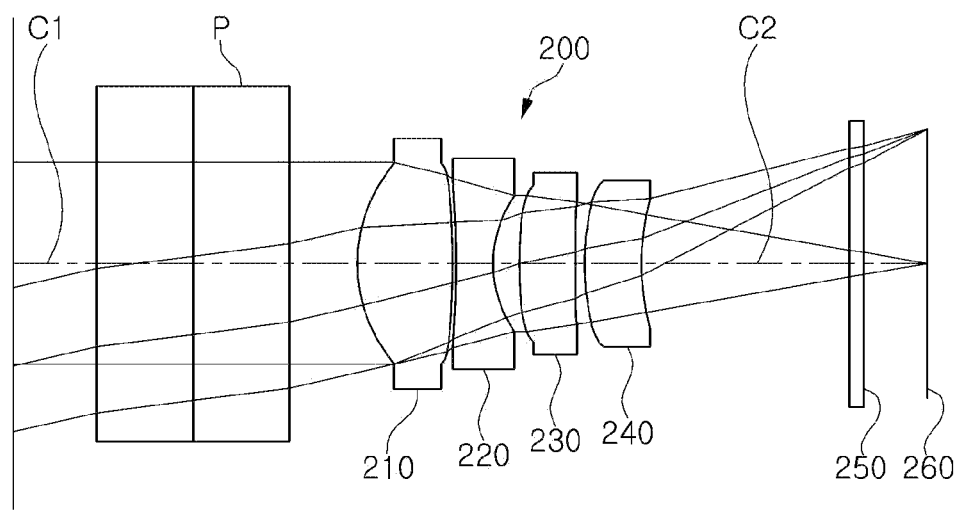
FIG. 3 is a diagram illustrating a second example of an optical imaging system.
Figure 4:
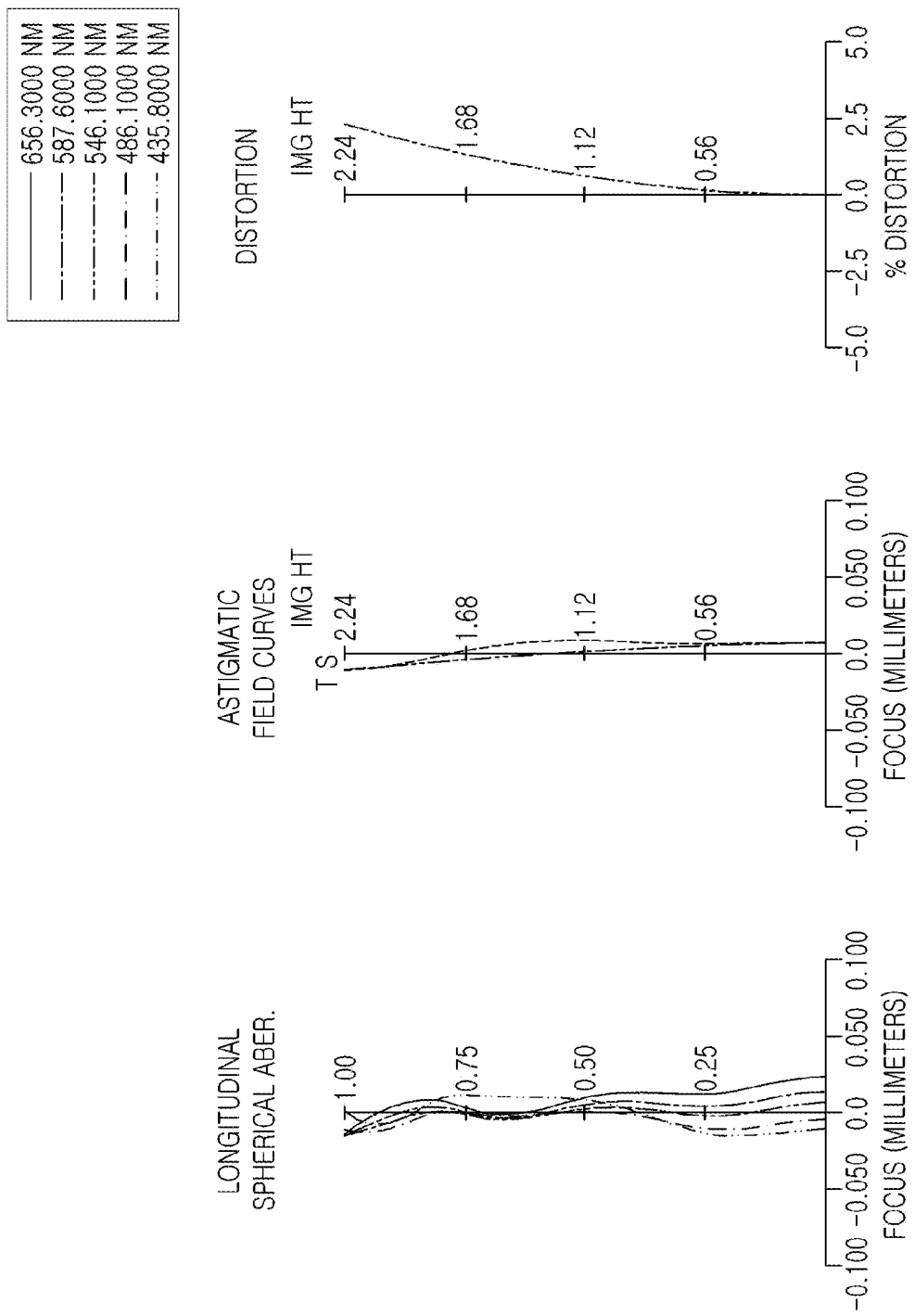
FIG. 4 shows aberration curves of the optical imaging system illustrated in FIG. 3.

A second example of an optical imaging system will be described with reference to FIGS. 3 and 4.

An optical imaging system 200 may include a prism P, a first lens 210, a second lens 220, a third lens 230, and a fourth lens 240.

The first lens 210 may have positive refractive power, and may have a convex object-side surface and a convex image-side surface. The second lens 220 may have negative refractive power, and may have a concave object-side surface and a concave image-side surface. The third lens 230 may have positive refractive power, and may have a convex object-side surface and a convex image-side surface. The fourth lens 240 may have negative refractive power, and may have a convex object-side surface and a concave image-side surface.

The optical imaging system 200 may include the prism P, a filter 250, and an image sensor 260.

The optical imaging system may include the prism P as a mechanism for folding or refracting an optical path. The prism P may fold light incident in a direction of a first optical axis C1 in a direction of a second optical axis C2. The second optical axis C2 refracted by the prism P may be almost perpendicular to the first optical axis C1. The prism P may be disposed on an object side of the first lens 210. The prism P disposed as above may refract light reflected from an object (a subject) to the image sensor 260.

The filter 250 may be disposed in front of the image sensor 260 and may block infrared rays, or the like, included in incident light. The image sensor 260 may include a plurality of optical sensors. The image sensor 260 may be configured to convert an optical signal into an electrical signal.

Table 3 lists characteristics of the lenses of the optical imaging system 200, and Table 4 lists aspherical values of the optical imaging system 200. FIG. 4 shows aberration curves of the optical imaging system 200.

TABLE 3

| Surface No. | Note | Radius of Curvature | Thickness/ Gap | Focal Length | Refractive Index | Abbe Number |
|---|---|---|---|---|---|---|
| 1 | Prism | infinity | 1.6180 | | 1.63490 | 23.90000 |
| 2 | | infinity | 1.6180 | | 1.63490 | 23.90000 |
| 3 | | infinity | 1.1326 | | | |
| 4* | First | 2.5334 | 1.6158 | 3.9065 | 1.53500 | 56.00000 |
| 5* | Lens | −9.5126 | 0.0488 | | | |
| 6* | Second | −93.4595 | 0.6275 | −2.9226 | 1.61500 | 25.90000 |
| 7* | Lens | 1.8544 | 0.4367 | | | |
| 8 | Third | 8.4131 | 0.9500 | 9.6290 | 1.67140 | 19.20000 |
| 9* | Lens | −27.9766 | 0.1500 | | | |
| 10* | Fourth | 4.0165 | 0.9500 | −329.9551 | 1.61500 | 25.90000 |
| 11* | Lens | 3.5824 | 3.4830 | | | |

TABLE 3-continued

| Surface No. | Note | Radius of Curvature | Thickness/ Gap | Focal Length | Refractive Index | Abbe Number |
|---|---|---|---|---|---|---|
| 12* | Filter | infinity | 0.2427 | | 1.54410 | 56.00000 |
| 13* | | infinity | 1.0700 | | | |
| 14 | Imaging Plane | infinity | −0.0069 | | | |

TABLE 4

| Surface No. | 4 | 5 | 6 | 7 | 8 | 9 | 10 | 11 |
|---|---|---|---|---|---|---|---|---|
| K | −1.28E−01 | 3.07E+01 | −1.69E+01 | 8.33E−02 | 3.97E+01 | 9.10E+01 | 5.09E−01 | 2.71 E+00 |
| A | 1.23E−03 | 1.36E−02 | −4.32E−02 | −8.54E−02 | 1.03E−03 | 1.99E−02 | −1.65E−02 | −3.05E−02 |
| B | −9.08E−04 | −3.22E−03 | 2.45E−02 | 5.41E−02 | −8.08E−03 | −2.22E−03 | −6.41E−03 | −7.01E−03 |
| C | 2.18E−03 | −6.90E−03 | −2.47E−03 | −8.48E−03 | 2.64E−02 | −2.72E−03 | 8.32E−03 | 1.62E−02 |
| D | −3.25E−03 | 1.88E−02 | 2.50E−04 | 5.01E−03 | −1.54E−02 | 2.12E−02 | 3.36E−03 | −2.14E−02 |
| E | 2.22E−03 | −1.85E−02 | 5.28E−04 | −8.14E−04 | 3.28E−03 | −9.48E−03 | −5.13E−03 | 1.58E−02 |
| F | −7.45E−04 | 1.28E−02 | −4.00E−04 | 2.82E−03 | 0 | −8.56E−03 | 1.76E−03 | −4.42E−03 |
| G | 8.07E−05 | −6.17E−03 | −1.43E−04 | −6.57E−03 | 0 | 6.59E−03 | 3.33E−04 | 2.49E−12 |
| H | 1.56E−05 | 1.61E−03 | −3.27E−05 | 2.79E−03 | 0 | 2.77E−15 | 0 | −2.10E−15 |
| J | −3.62E−06 | −1.64E−04 | 3.78E−05 | 9.37E−14 | 0 | 1.25E−15 | 0 | 1.92E−15 |

Figure 5:
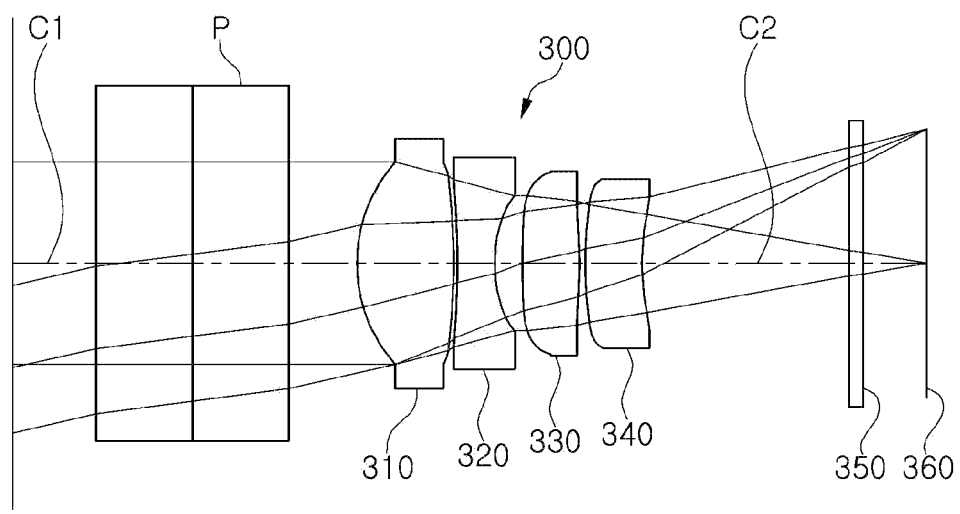
FIG. 5 is a diagram illustrating a third example of an optical imaging system.
Figure 6:
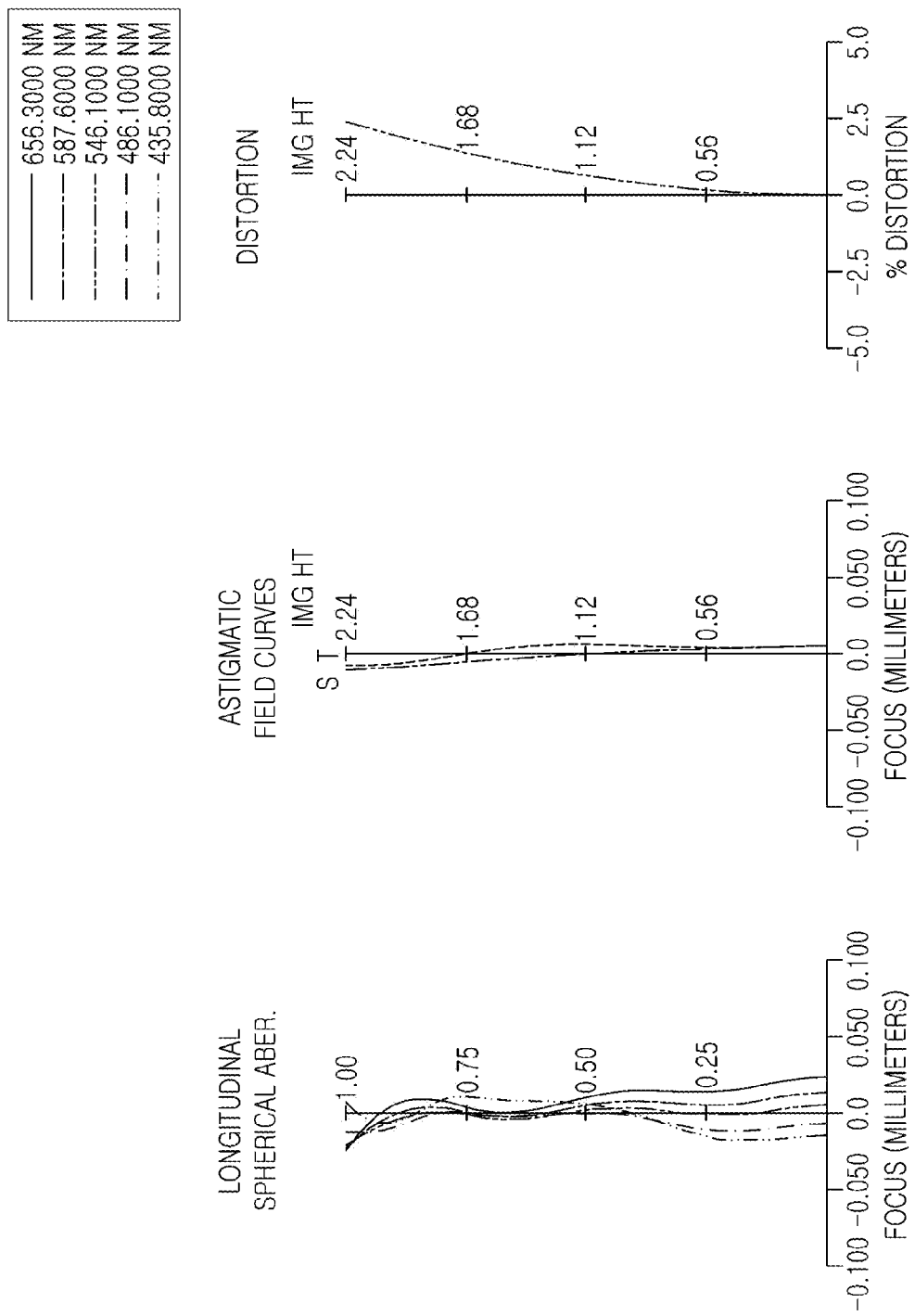
FIG. 6 shows aberration curves of the optical imaging system illustrated in FIG. 5.

A third example of an optical imaging system will be described with reference to FIGS. 5 and 6.

An optical imaging system 300 may include a prism P, a first lens 310, a second lens 320, a third lens 330, and a fourth lens 340.

The first lens 310 may have positive refractive power, and may have a convex object-side surface and a convex image-side surface. The second lens 320 may have negative refractive power, and may have a concave object-side surface and a concave image-side surface. The third lens 330 may have positive refractive power, and may have a convex object-side surface and a convex image-side surface. The fourth lens 340 may have negative refractive power, and may have a convex object-side surface and a concave image-side surface.

The optical imaging system 300 may include the prism P, a filter 350, and an image sensor 360.

The optical imaging system may include the prism P as a mechanism for folding or refracting an optical path. The prism P may fold light incident in a direction of a first optical axis C1 in a direction of a second optical axis C2. The second optical axis C2 refracted by the prism P may be almost perpendicular to the first optical axis C1. The prism P may be disposed on an object side of the first lens 310. The prism P disposed as above may refract light reflected from an object (a subject) to the image sensor 360.

The filter 350 may be disposed in front of the image sensor 360 and may block infrared rays, or the like, included in incident light. The image sensor 360 may include a plurality of optical sensors. The image sensor 360 may be configured to convert an optical signal into an electrical signal.

Table 5 lists characteristics of the lenses of the optical imaging system 300, and Table 6 lists aspherical values of the optical imaging system 300. FIG. 6 shows aberration curves of the optical imaging system 300.

TABLE 5

| Surface No. | Note | Radius of Curvature | Thickness/ Gap | Focal Length | Refractive Index | Abbe Number |
|---|---|---|---|---|---|---|
| 1 | Prism | infinity | 1.6180 | | 1.63490 | 23.90000 |
| 2 | | infinity | 1.6180 | | 1.63490 | 23.90000 |
| 3 | | infinity | 1.1326 | | | |
| 4* | First | 2.5090 | 1.6106 | 3.8768 | 1.53500 | 56.00000 |
| 5* | Lens | −9.5162 | 0.0580 | | | |
| 6* | Second | −76.5761 | 0.6294 | −3.0584 | 1.61500 | 25.90000 |
| 7* | Lens | 1.9524 | 0.4619 | | | |
| 8 | Third | 13.3463 | 0.9500 | 8.4846 | 1.67140 | 19.20000 |
| 9* | Lens | −9.8419 | 0.1038 | | | |
| 10* | Fourth | 5.3395 | 0.9500 | −25.0000 | 1.61500 | 25.90000 |
| 11* | Lens | 3.7017 | 3.4487 | | | |
| 12* | Filter | infinity | 0.2427 | | 1.54410 | 56.00000 |
| 13* | | infinity | 1.0700 | | | |
| 14 | Imaging Plane | infinity | −0.0053 | | | |

TABLE 6

| Surface No. | 4 | 5 | 6 | 7 | 8 | 9 | 10 | 11 |
|---|---|---|---|---|---|---|---|---|
| K | −1.07E−01 | 3.10E+01 | 9.90E+01 | 9.35E−02 | 7.62E+01 | 3.19E+00 | 1.09E+00 | 2.43E+00 |
| A | 1.54E−03 | 1.42E−02 | −4.37E−02 | −8.61E−02 | 7.89E−05 | 2.07E−02 | −1.66E−02 | −3.46E−02 |
| B | −8.33E−04 | −3.04E−03 | 2.44E−02 | 5.72E−02 | −2.08E−03 | −4.20E−03 | −9.60E−03 | −5.09E−02 |
| C | 2.21E−03 | −7.01E−03 | −2.28E−03 | −7.78E−03 | 2.72E−02 | −4.99E−03 | 4.46E−03 | 1.43E−02 |
| D | −3.24E−03 | 1.87E−02 | 2.48E−04 | 5.85E−03 | −1.67E−02 | 2.26E−02 | 6.16E−03 | −2.07E−02 |
| E | 2.22E−03 | −1.85E−02 | 4.71E−04 | −1.38E−03 | 4.39E−03 | −9.48E−03 | −5.13E−03 | 1.58E−02 |
| F | −7.45E−04 | 1.28E−02 | −4.27E−04 | 2.82E−03 | 0 | −8.56E−03 | 1.76E−03 | −4.42E−02 |
| G | 8.06E−05 | −6.17E−03 | −1.42E−04 | −6.57E−03 | 0 | 6.59E−03 | 3.33E−04 | 2.48E−12 |
| H | 1.55E−05 | 1.61E−03 | −2.62E−05 | 2.79E−03 | 0 | 2.03E−15 | 0 | −2.91E−15 |
| J | −3.59E−06 | −1.64E−04 | 3.81E−05 | 9.36E−14 | 0 | 1.11E−15 | 0 | 1.77E−15 |

Figure 7:
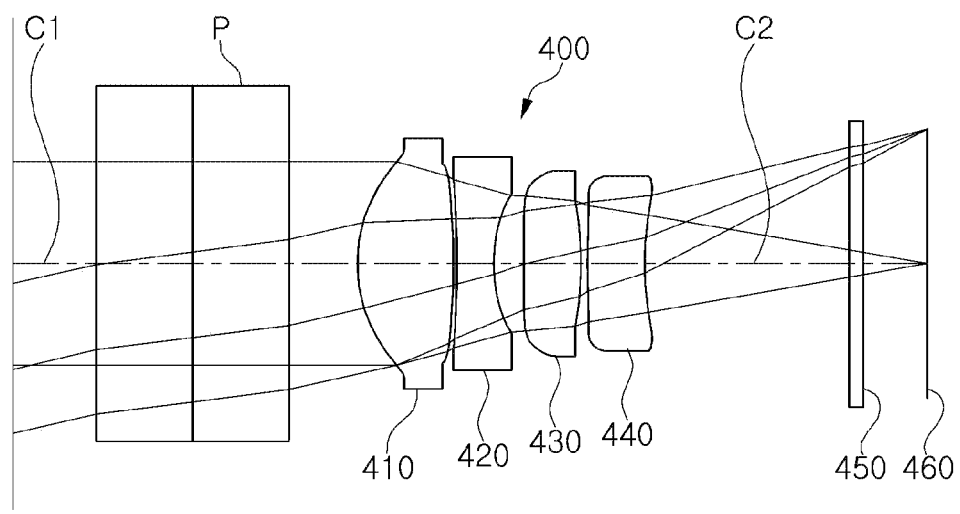
FIG. 7 is a diagram illustrating a fourth example of an optical imaging system.
Figure 8:
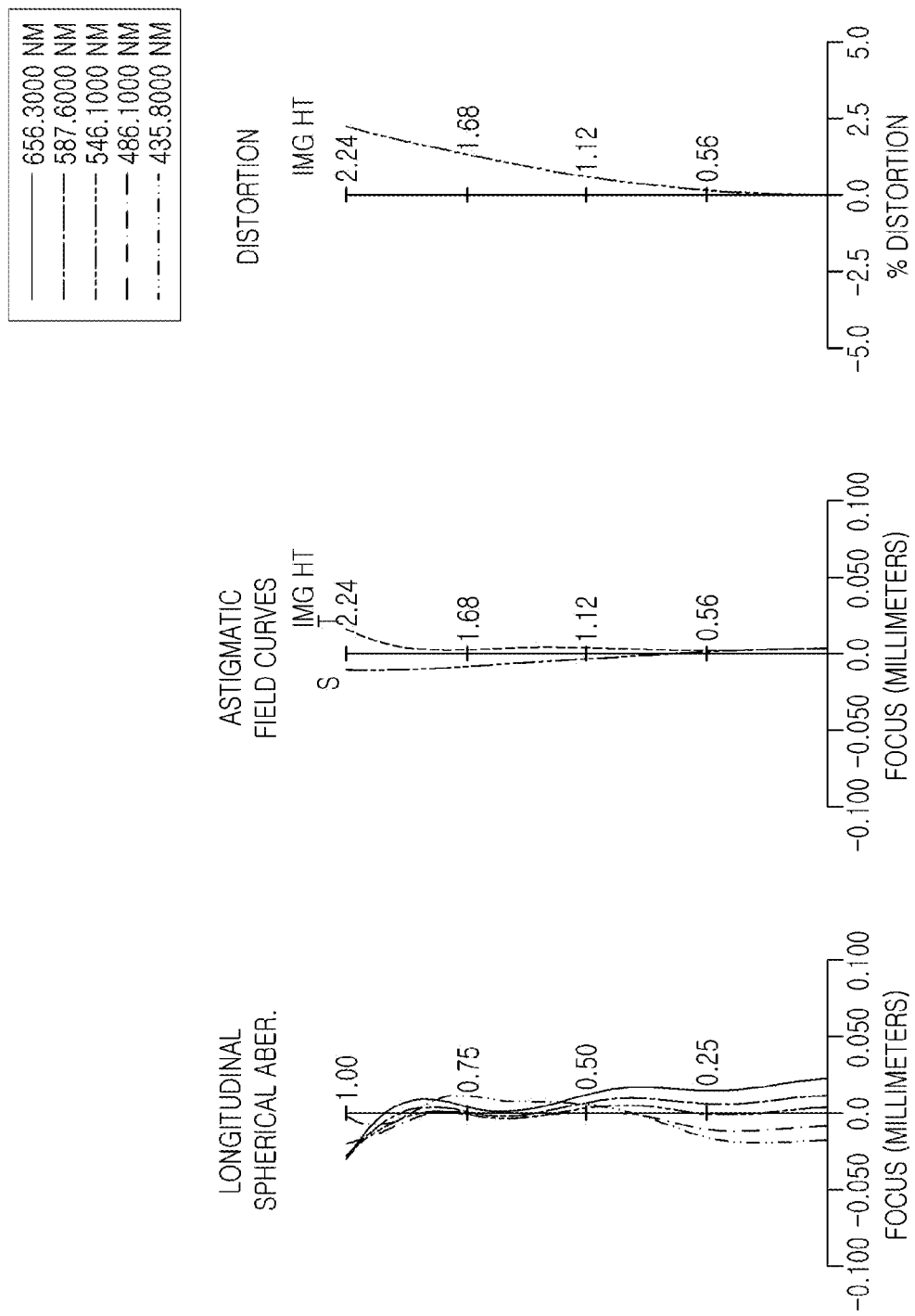
FIG. 8 shows aberration curves of the optical imaging system illustrated in FIG. 7.

A fourth example of an optical imaging system will be described with reference to FIGS. 7 and 8.

An optical imaging system 400 may include a prism P, a first lens 410, a second lens 420, a third lens 430, and a fourth lens 440.

The first lens 410 may have positive refractive power, and may have a convex object-side surface and a convex image-side surface. The second lens 420 may have negative refractive power, and may have a concave object-side surface and a concave image-side surface. The third lens 430 may have positive refractive power, and may have a concave object-side surface and a convex image-side surface. The fourth lens 440 may have negative refractive power, and may have a convex object-side surface and a concave image-side surface.

The optical imaging system 400 may include the prism P, a filter 450, and an image sensor 460.

The optical imaging system may include the prism P as a mechanism for folding or refracting an optical path. The prism P may fold light incident in a first optical axis C1 direction in a direction of a second optical axis C2. The second optical axis C2 refracted by the prism P may be almost perpendicular to the first optical axis C1. The prism P may be disposed on an object side of the first lens 410. The prism P disposed as above may refract light reflected from an object (a subject) to the image sensor 460.

The filter 450 may be disposed in front of the image sensor 460 and may block infrared rays, or the like, included in incident light. The image sensor 460 may include a plurality of optical sensors. The image sensor 460 may be configured to convert an optical signal into an electrical signal.

Table 7 lists characteristics of the lenses of the optical imaging system 400, and Table 8 lists aspherical values of the optical imaging system 400. FIG. 8 shows aberration curves of the optical imaging system 400.

TABLE 7

| Surface No. | Note | Radius of Curvature | Thickness/ Gap | Focal Length | Refractive Index | Abbe Number |
|---|---|---|---|---|---|---|
| 1 | Prism | infinity | 1.6180 | | 1.63490 | 23.90000 |
| 2 | | infinity | 1.6180 | | 1.63490 | 23.90000 |
| 3 | | infinity | 1.1326 | | | |
| 4* | First | 2.5066 | 1.5952 | 3.8632 | 1.53500 | 56.00000 |
| 5* | Lens | −9.3886 | 0.0527 | | | |
| 6* | Second | −133.027 | 0.6200 | −3.4934 | 1.61500 | 25.90000 |
| 7* | Lens | 2.2079 | 0.5050 | | | |
| 8 | Third | −81.2138 | 0.9500 | 7.3982 | 1.67140 | 19.20000 |
| 9* | Lens | −4.7524 | 0.1167 | | | |
| 10* | Fourth | 13.6238 | 0.9500 | −10.0000 | 1.61500 | 25.90000 |
| 11* | Lens | 4.1499 | 3.4015 | | | |
| 12* | Filter | infinity | 0.2427 | | 1.54410 | 56.00000 |
| 13* | | infinity | 1.0700 | | | |
| 14 | Imaging Plane | infinity | −0.0038 | | | |

50

TABLE 8

| Surface No. | 4 | 5 | 6 | 7 | 8 | 9 | 10 | 11 |
|---|---|---|---|---|---|---|---|---|
| K | −9.02E−02 | 3.15E+01 | −9.90E+01 | 1.87E−01 | 9.90E+01 | 2.02E+00 | −6.30E+01 | 1.22E+00 |
| A | 1.98E−03 | 1.46E−02 | −4.42E−02 | −8.36E−02 | −9.10E−04 | 2.17E−02 | −1.98E−02 | −3.85E−02 |
| B | −8.07E−04 | −2.89E−03 | 2.42E−02 | 5.82E−02 | 1.59E−03 | −4.88E−03 | −1.20E−02 | −2.55E−03 |
| C | 2.19E−03 | −7.04E−03 | −2.20E−03 | −9.18E−03 | 2.78E−02 | −5.05E−03 | 5.07E−03 | 1.52E−02 |
| D | −3.24E−03 | 1.87E−02 | 2.69E−04 | 5.94E−03 | −1.72E−02 | 2.38E−02 | 7.11E−03 | −2.13E−02 |
| E | 2.22E−03 | −1.85E−02 | 4.62E−04 | −3.98E−04 | 5.23E−03 | −9.48E−03 | −5.13E−03 | 1.58E−02 |
| F | −7.45E−04 | 1.28E−02 | −4.33E−04 | 2.82E−03 | 0 | −8.56E−03 | 1.76E−03 | −4.42E−03 |
| G | 8.05E−05 | −6.16E−03 | −1.43E−04 | −6.57E−03 | 0 | 6.59E−03 | 3.33E−04 | 2.48E−12 |
| H | 1.55E−05 | 1.61E−03 | −2.53E−05 | 2.79E−03 | 0 | 1.99E−15 | 0 | −2.92E−15 |
| J | −3.59E−06 | −1.64E−04 | 3.86E−05 | 9.36E−14 | 0 | 1.11E−15 | 0 | 1.77E−15 |

Figure 9:
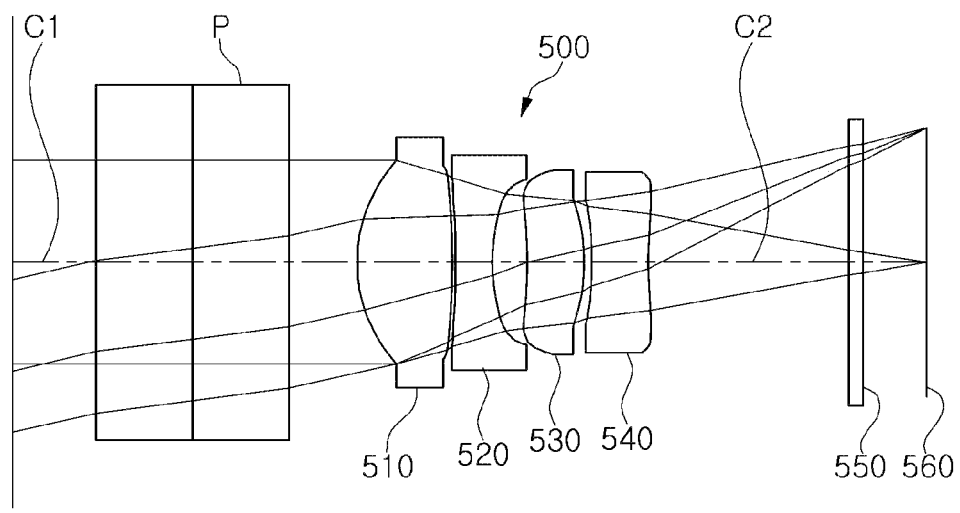
FIG. 9 is a diagram illustrating a fifth example of an optical imaging system.
Figure 10:
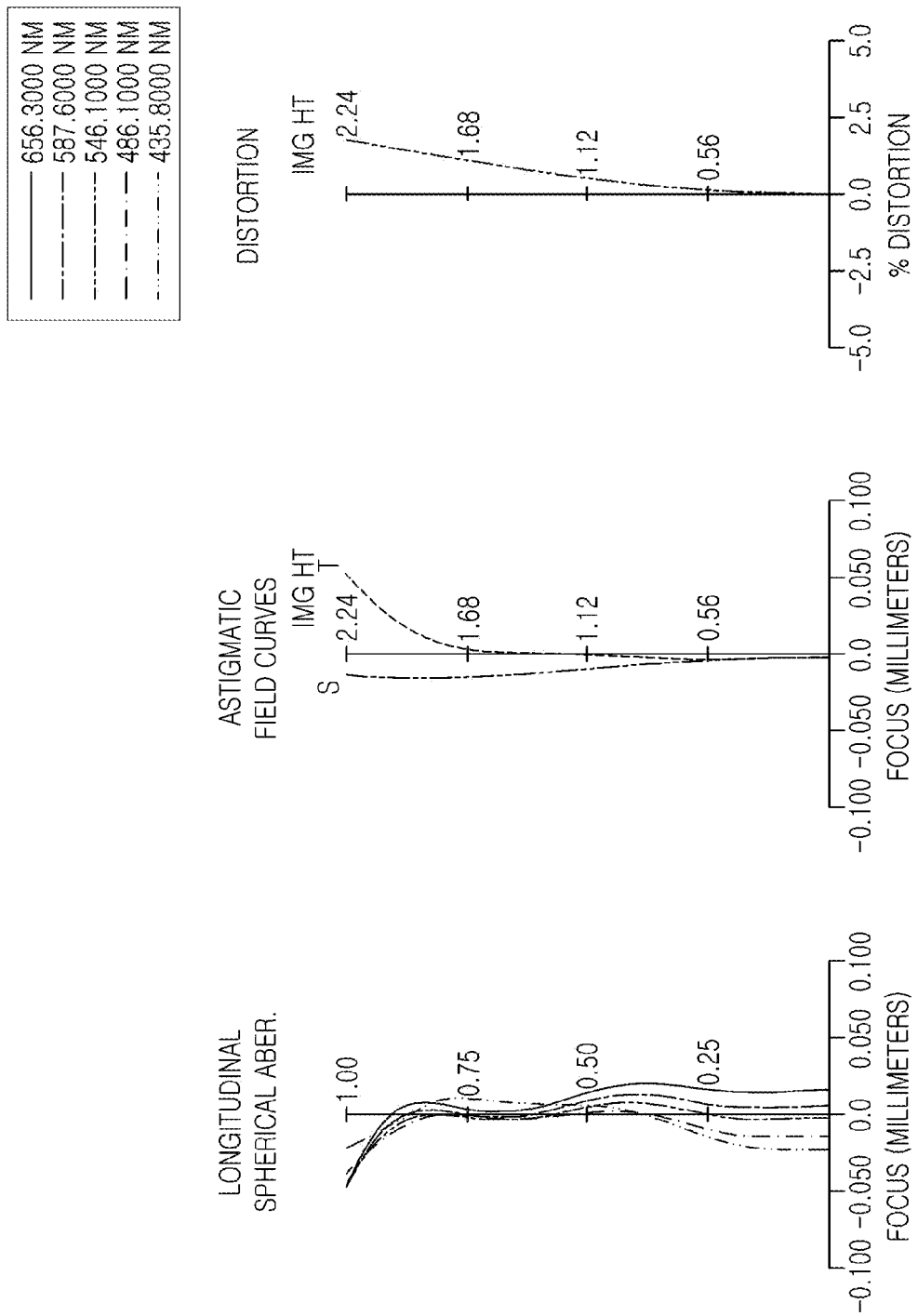
FIG. 10 shows aberration curves of the optical imaging system illustrated in FIG. 9.

A fifth example of an optical imaging system will be described with reference to FIGS. 9 and 10.

An optical imaging system 500 may include a prism P, a first lens 510, a second lens 520, a third lens 530, and a fourth lens 540.

The first lens 510 may have positive refractive power, and may have a convex object-side surface and a convex image-side surface. The second lens 520 may have negative refractive power, and may have a concave object-side surface and a concave image-side surface. The third lens 530 may have positive refractive power, and may have a concave object-side surface and a convex image-side surface. The fourth lens 540 may have negative refractive power, and may have a concave object-side surface and a concave image-side surface.

The optical imaging system 500 may include the prism P, a filter 550, and an image sensor 560.

The optical imaging system may include the prism P as a mechanism for folding or refracting an optical path. The prism P may fold light incident in a direction of a first optical axis C1 in a direction of a second optical axis C2. The second optical axis C2 refracted by the prism P may be almost perpendicular to the first optical axis C1. The prism P may be disposed on an object side of the first lens 510. The prism P disposed as above may refract light reflected from an object (a subject) to the image sensor 560.

The filter 550 may be disposed in front of the image sensor 560 and may block infrared rays, or the like, included in incident light. The image sensor 560 may include a plurality of optical sensors. The image sensor 560 may be configured to convert an optical signal into an electrical signal.

Table 9 lists characteristics of the lenses of the optical imaging system 500, and Table 10 lists aspherical values of the optical imaging system 500. FIG. 10 shows aberration curves of the optical imaging system 500.

Figure 11:
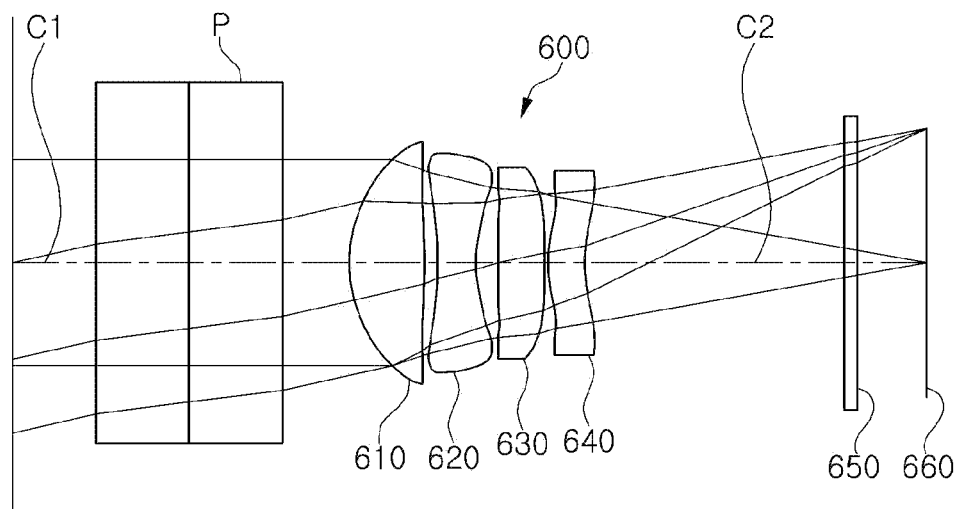
FIG. 11 is a diagram illustrating a sixth example of an optical imaging system.
Figure 12:
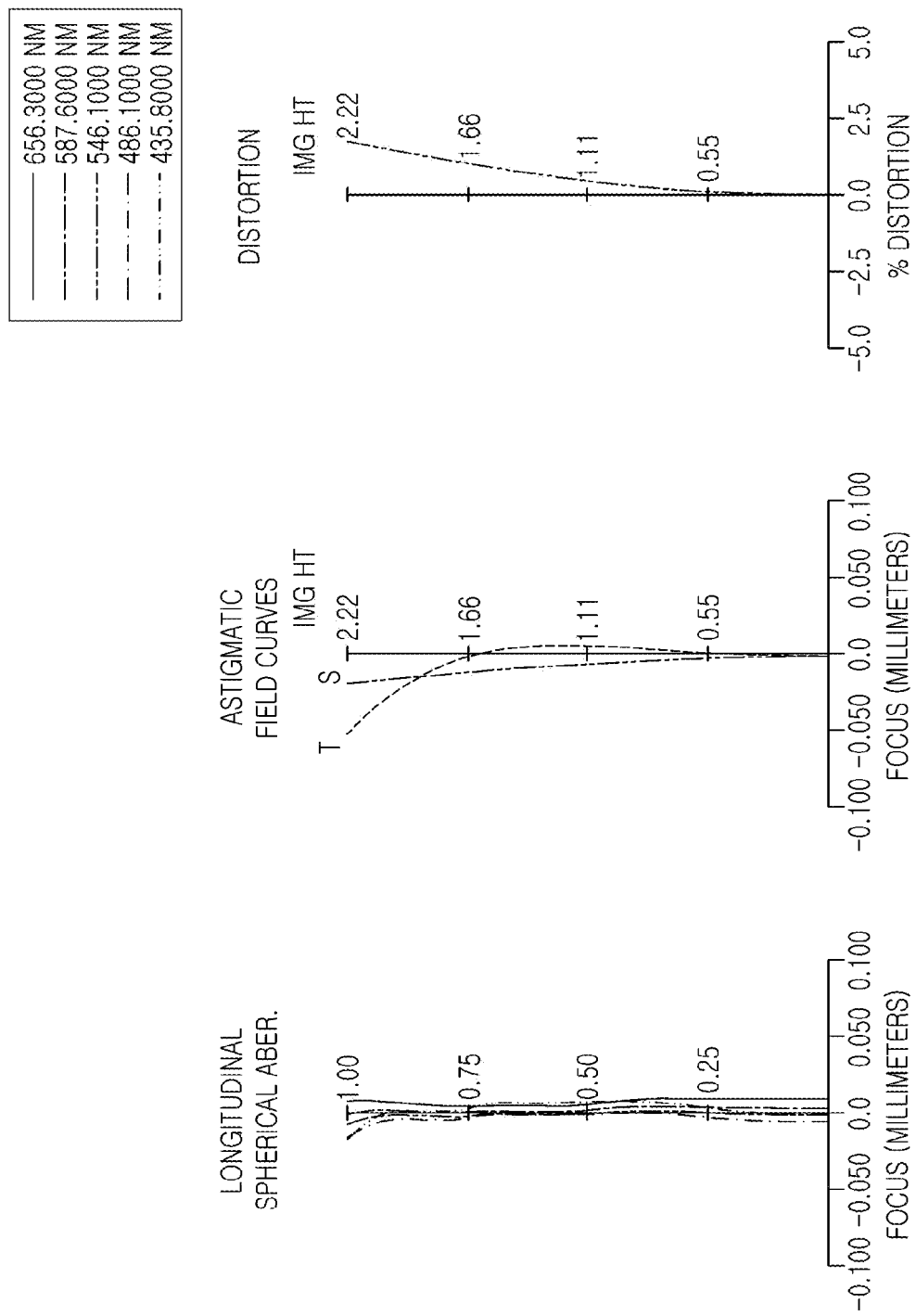
FIG. 12 shows aberration curves of the optical imaging system illustrated in FIG. 11.

A sixth example of an optical imaging system will be described with reference to FIGS. 11 and 12.

An optical imaging system 600 may include a prism P, a first lens 610, a second lens 620, a third lens 630, and a fourth lens 640.

The first lens 610 may have positive refractive power, and may have a convex object-side surface and a convex image-side surface. The second lens 620 may have negative refractive power, and may have a concave object-side surface and a concave image-side surface. The third lens 630 may have positive refractive power, and may have a convex object-side surface and a convex image-side surface. The fourth lens 640 may have positive refractive power, and may have a convex object-side surface and a concave image-side surface.

The optical imaging system 600 may include the prism P, a filter 650, and an image sensor 660.

The optical imaging system may include the prism P as a mechanism for folding or refracting an optical path. The prism P may fold light incident in a direction of a first optical axis C1 in a direction of a second optical axis C2. The second optical axis C2 refracted by the prism P may be almost perpendicular to the first optical axis C1. The prism P may be disposed on an object side of the first lens 610. The prism P disposed as above may refract light reflected from an object (a subject) to the image sensor 660.

The filter 650 may be disposed in front of the image sensor 660 and may block infrared rays, or the like, included in incident light. The image sensor 660 may include a plurality of optical sensors. The image sensor 660 may be configured to convert an optical signal into an electrical signal.

Table 11 lists characteristics of the lenses of the optical imaging system 600, and Table 12 lists aspherical values of the optical imaging system 600. FIG. 12 shows aberration curves of the optical imaging system 600.

TABLE 9

| Surface No. | Note | Radius of Curvature | Thickness/ Gap | Focal Length | Refractive Index | Abbe Number |
|---|---|---|---|---|---|---|
| 1 | Prism | infinity | 1.6180 | | 1.63490 | 23.90000 |
| 2 | | infinity | 1.6180 | | 1.63490 | 23.90000 |
| 3 | | infinity | 1.1326 | | | |
| 4* | First | 2.5079 | 1.5845 | 3.8497 | 1.53500 | 56.00000 |
| 5* | Lens | −9.1988 | 0.0461 | | | |
| 6* | Second | −118.740 | 0.6200 | −4.3132 | 1.61500 | 25.90000 |
| 7* | Lens | 2.7440 | 0.5769 | | | |
| 8 | Third | −7.5014 | 0.9500 | 6.4488 | 1.67140 | 19.20000 |
| 9* | Lens | −2.9061 | 0.1276 | | | |
| 10* | Fourth | −9.9496 | 0.9500 | −6.0001 | 1.61500 | 25.90000 |
| 11* | Lens | 6.1682 | 3.3503 | | | |
| 12* | Filter | infinity | 0.2427 | | 1.54410 | 56.00000 |
| 13* | | infinity | 1.0500 | | | |
| 14 | Imaging Plane | infinity | 0.0019 | | | |

TABLE 10

| Surface No. | 4 | 5 | 6 | 7 | 8 | 9 | 10 | 11 |
|---|---|---|---|---|---|---|---|---|
| K | −7.01E−02 | 3.17E+01 | −9.90E+01 | 2.41E−01 | 1.58E+01 | 1.29E+00 | 2.80E+01 | 9.09E−02 |
| A | 2.41E−03 | 1.45E−02 | −4.43E−02 | −8.39E−02 | −7.91E−03 | 2.84E−02 | −2.69E−02 | −4.16E−02 |
| B | −7.18E−04 | −2.67E−03 | 2.39E−02 | 5.98E−02 | 9.71E−03 | −7.15E−03 | −1.59E−02 | 9.08E−04 |
| C | 2.15E−03 | −7.14E−03 | −2.00E−03 | −1.09E−02 | 2.76E−02 | −3.68E−03 | 1.99E−03 | 1.32E−02 |
| D | −3.24E−03 | 1.87E−02 | 3.62E−04 | 5.46E−03 | −1.94E−02 | 2.27E−02 | 8.55E−03 | −2.08E−02 |
| E | 2.22E−03 | −1.85E−02 | 4.64E−04 | 1.12E−03 | 6.66E−03 | −9.48E−03 | −5.13E−03 | 1.58E−02 |
| F | −7.45E−04 | 1.28E−02 | −4.46E−04 | 2.82E−03 | 0 | −8.56E−03 | 1.76E−03 | −4.42E−03 |
| G | 8.04E−05 | −6.16E−03 | −1.50E−04 | −6.57E−03 | 0 | 6.59E−03 | 3.33E−04 | 2.48E−12 |
| H | 1.54E−05 | 1.62E−03 | −2.55E−05 | 2.79E−03 | 0 | 1.81E−15 | 0 | −2.93E−15 |
| J | −3.60E−06 | −1.63E−04 | 4.07E−05 | 9.36E−14 | 0 | 1.09E−15 | 0 | 1.76E−15 |

TABLE 11

| Surface No. | Note | Radius of Curvature | Thickness/ Gap | Focal Length | Refractive Index | Abbe Number |
|---|---|---|---|---|---|---|
| 1 | Prism | infinity | 1.5440 | | 1.63490 | 23.90000 |
| 2 | | infinity | 1.5440 | | 1.63490 | 23.90000 |
| 3 | | infinity | 1.1194 | | | |
| 4* | First | 2.4809 | 1.2410 | 3.8330 | 1.53500 | 56.00000 |
| 5* | Lens | −10.0050 | 0.2107 | | | |
| 6* | Second | −5.9163 | 0.6414 | −2.8632 | 1.61500 | 25.90000 |
| 7* | Lens | 2.6451 | 0.3611 | | | |
| 8 | Third | 32.2309 | 0.7720 | 16.7347 | 1.67140 | 19.20000 |
| 9* | Lens | −17.3757 | 0.0618 | | | |
| 10* | Fourth | 2.1068 | 0.5981 | 16.5768 | 1.61500 | 25.90000 |
| 11* | Lens | 2.3614 | 4.3100 | | | |
| 12* | Filter | infinity | 0.2100 | | 1.54410 | 56.00000 |
| 13* | | infinity | 1.1618 | | | |
| 14 | Imaging Plane | infinity | 0.0016 | | | |

TABLE 12

| Surface No. | 4 | 5 | 6 | 7 | 8 | 9 | 10 | 11 |
|---|---|---|---|---|---|---|---|---|
| K | 0.00E+00 | 0.00E+00 | 0.00E+00 | 0.00E+00 | 0.00E+00 | 0.00E+00 | 0.00E+00 | 0.00E+00 |
| A | 1.15E−03 | 1.80E−02 | −1.14E−02 | −6.40E−02 | 2.64E−02 | −2.06E−02 | −1.25E−01 | −6.87E−02 |
| B | −1.43E−04 | −3.31E−03 | 1.75E−02 | 3.66E−02 | −2.66E−02 | −6.54E−03 | −1.10E−02 | −3.26E−02 |
| C | 1.36E−03 | 8.52E−04 | −3.01E−03 | −8.99E−03 | 7.11E−03 | −8.22E−03 | −6.19E−03 | 3.18E−02 |
| D | −1.60E−03 | 6.83E−04 | −8.68E−04 | −1.67E−03 | −3.65E−03 | 8.05E−03 | 1.41E−02 | −1.13E−02 |
| E | 9.08E−04 | −5.05E−06 | 1.87E−04 | −1.71E−03 | 2.89E−04 | −2.00E−03 | −4.63E−03 | 1.41E−03 |
| F | −2.46E−04 | −3.03E−04 | −3.58E−06 | 1.55E−03 | 0 | 0 | 0 | 0 |
| G | 2.60E−05 | 8.39E−05 | 1.61E−05 | −3.18E−04 | 0 | 0 | 0 | 0 |
| H | 0 | 0 | 0 | 0 | 0 | 0 | 0 | 0 |
| J | 0 | 0 | 0 | 0 | 0 | 0 | 0 | 0 |

Figure 13:
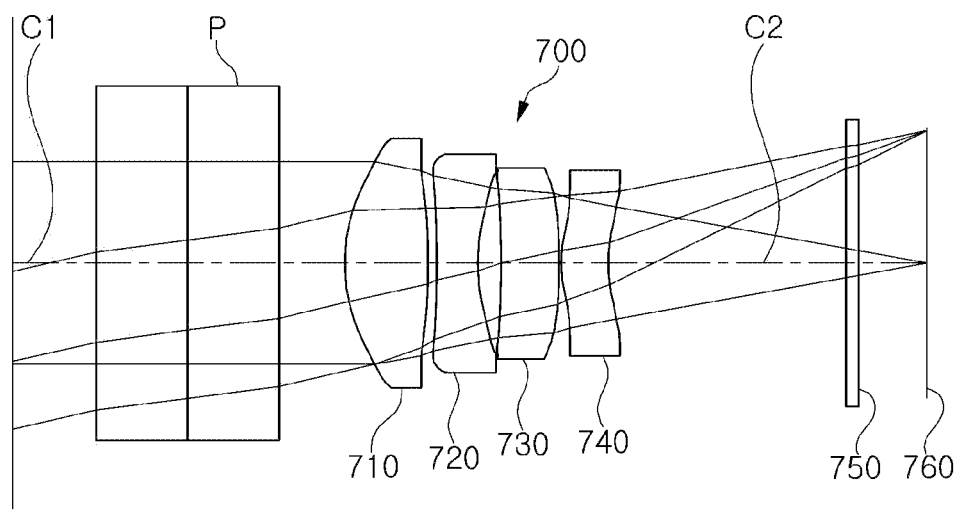
FIG. 13 is a diagram illustrating a seventh example of an optical imaging system.
Figure 14:
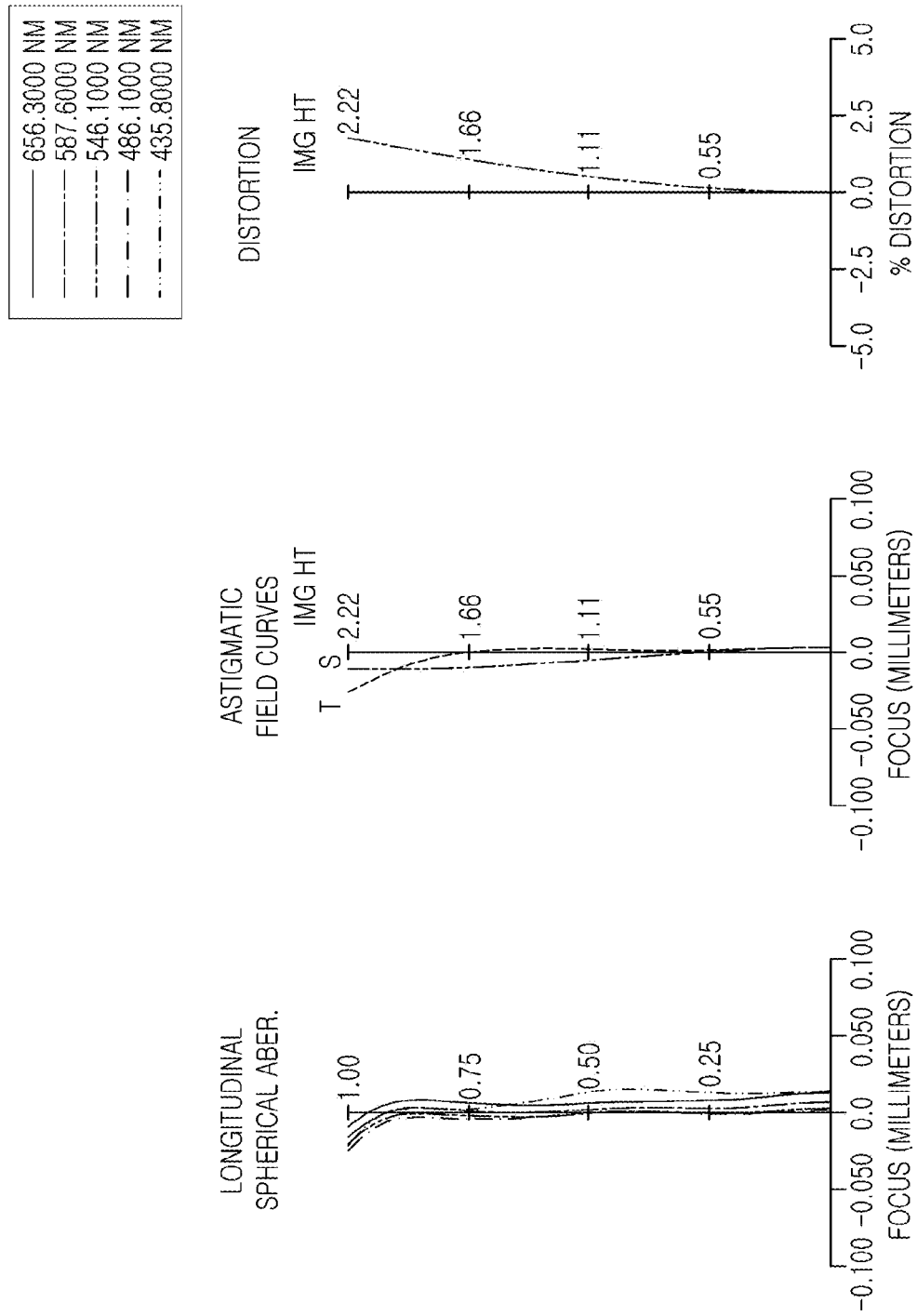
FIG. 14 shows aberration curves of the optical imaging system illustrated in FIG. 13.

A seventh example of an optical imaging system will be described with reference to FIGS. 13 and 14.

An optical imaging system 700 may include a prism P, a first lens 710, a second lens 720, a third lens 730, and a fourth lens 740.

The first lens 710 may have positive refractive power, and may have a convex object-side surface and a convex image-side surface. The second lens 720 may have negative refractive power, and may have a concave object-side surface and a concave image-side surface. The third lens 730 may have negative refractive power, and may have a concave object-side surface and a convex image-side surface. The fourth lens 740 may have positive refractive power, and may have a convex object-side surface and a concave image-side surface.

The optical imaging system 700 may include the prism P, a filter 750, and an image sensor 760.

The optical imaging system may include the prism P as a mechanism for folding or refracting an optical path. The prism P may fold light incident in a direction of a first optical axis C1 in a direction of a second optical axis C2. The second optical axis C2 refracted by the prism P may be almost perpendicular to the first optical axis C1. The prism P may be disposed on an object side of the first lens 710. The prism P may refract light reflected from an object (a subject) to the image sensor 760.

The filter 750 may be disposed in front of the image sensor 760 and may block infrared rays, or the like, included in incident light. The image sensor 760 may include a plurality of optical sensors. The image sensor 760 may be configured to convert an optical signal into an electrical signal.

Table 13 lists characteristics of the lenses of the optical imaging system 700, and Table 14 lists aspherical values of the optical imaging system 700. FIG. 14 is aberration curves of the optical imaging system 700.

TABLE 13

| Surface No. | Note | Radius of Curvature | Thickness/ Gap | Focal Length | Refractive Index | Abbe Number |
|---|---|---|---|---|---|---|
| 1 | Prism | infinity | 1.5440 | | 1.63490 | 23.90000 |
| 2 | | infinity | 1.5440 | | 1.63490 | 23.90000 |
| 3 | | infinity | 1.1194 | | | |
| 4* | First | 3.0000 | 1.4000 | 4.3547 | 1.53500 | 56.00000 |
| 5* | Lens | −8.8982 | 0.1481 | | | |
| 6* | Second | −250.000 | 0.6926 | −4.2453 | 1.61500 | 25.90000 |
| 7* | Lens | 2.6655 | 0.3965 | | | |
| 8 | Third | −6.9257 | 0.9734 | −51.3113 | 1.67140 | 19.20000 |
| 9* | Lens | −9.1355 | 0.0400 | | | |
| 10* | Fourth | 2.1000 | 0.7968 | 13.1062 | 1.61500 | 25.90000 |
| 11* | Lens | 2.4196 | 4.0062 | | | |
| 12* | Filter | infinity | 0.2100 | | 1.54410 | 56.00000 |

TABLE 13-continued

| Surface No. | Note | Radius of Curvature | Thickness/ Gap | Focal Length | Refractive Index | Abbe Number |
|---|---|---|---|---|---|---|
| 13* | | infinity | 1.1600 | | | |
| 14 | Imaging Plane | infinity | −0.0030 | | | |

TABLE 14

| Surface No. | 4 | 5 | 6 | 7 | 8 | 9 | 10 | 11 |
|---|---|---|---|---|---|---|---|---|
| K | −1.80E−01 | 2.51E+01 | 9.90E+01 | −3.91E−01 | −5.21E+01 | −7.28E+01 | 4.26E−01 | 5.09E−01 |
| A | 1.33E−03 | 1.82E−02 | −3.21E−02 | −6.60E−02 | 4.71E−02 | −1.08E−02 | −1.12E−01 | −6.67E−02 |
| B | −1.20E−03 | −5.52E−03 | 1.43E−02 | 3.87E−02 | −2.66E−02 | −2.08E−03 | −3.72E−03 | −1.63E−02 |
| C | 1.44E−03 | 7.08E−04 | −1.97E−03 | −1.20E−02 | 1.38E−02 | −5.87E−03 | −6.78E−03 | 1.55E−02 |
| D | −1.72E−03 | 5.84E−04 | −4.48E−04 | −5.44E−04 | −7.76E−03 | 6.23E−03 | 8.26E−03 | −5.31E−03 |
| E | 9.06E−04 | 7.92E−05 | 1.23E−04 | −2.21E−03 | −4.38E−04 | −2.48E−03 | −3.12E−03 | 1.72E−04 |
| F | −2.35E−04 | −2.36E−04 | −5.25E−05 | 1.26E−03 | 8.55E−04 | 7.56E−05 | 2.47E−05 | 1.52E−04 |
| G | 2.32E−05 | 6.13E−05 | 3.04E−05 | 0.00E+00 | 1.10E−05 | 9.39E−05 | 5.47E−13 | 6.41E−13 |
| H | 0 | 0 | 0 | 0 | 0 | 0 | 0 | 0 |
| J | 0 | 0 | 0 | 0 | 0 | 0 | 0 | 0 |

Figure 15:
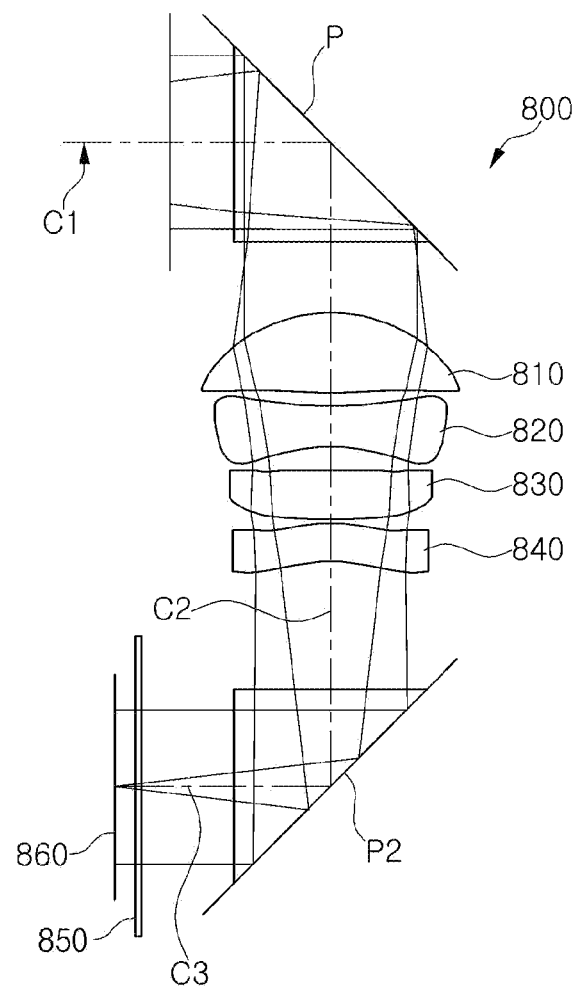
FIG. 15 is a diagram illustrating an eighth example of an optical imaging system.
Figure 16:
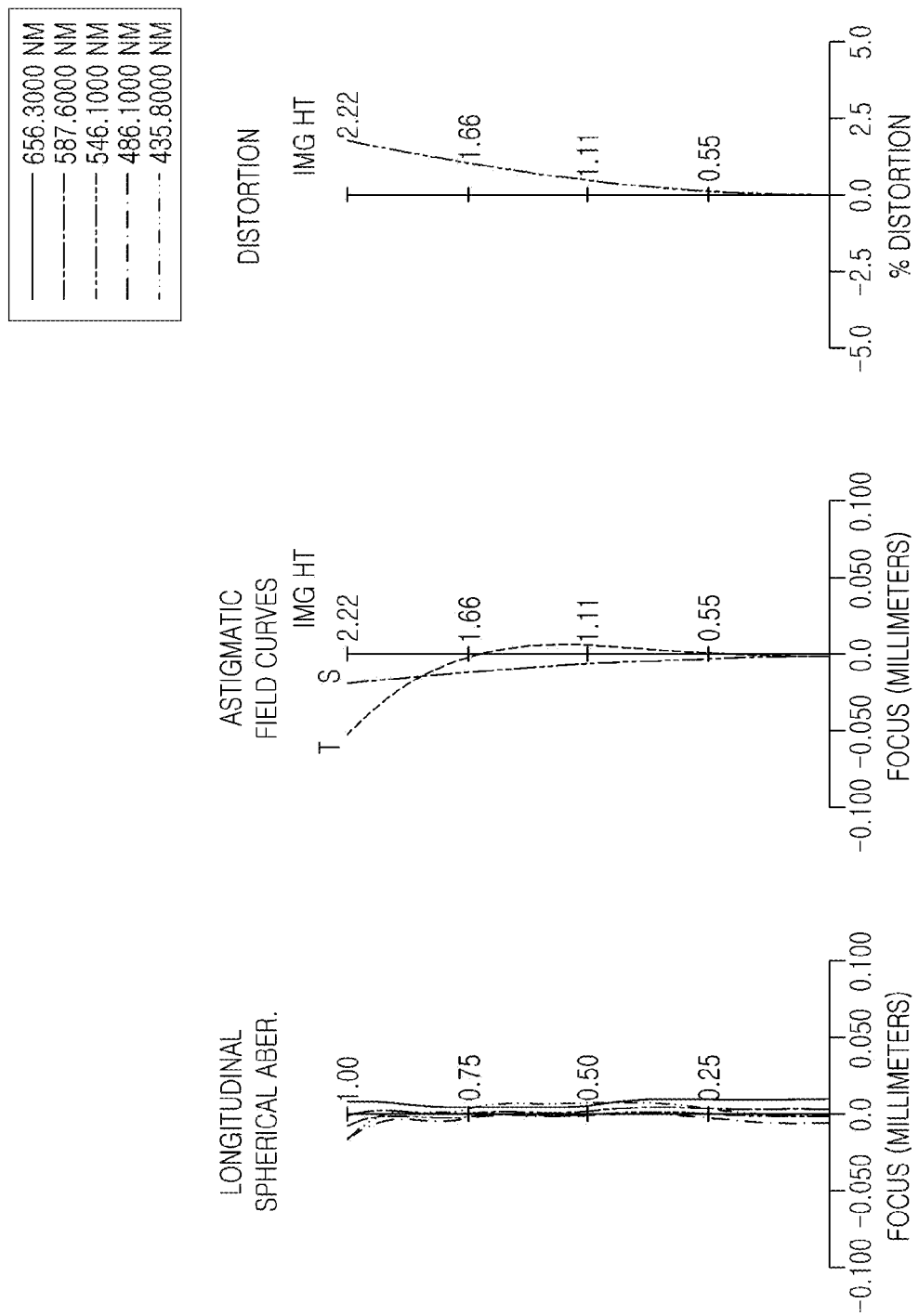
FIG. 16 shows aberration curves of the optical imaging system illustrated in FIG. 15.

An eighth example of an optical imaging system will be described with reference to FIGS. 15 and 16.

An optical imaging system 800 may include a first prism P1, a first lens 810, a second lens 820, a third lens 830, and a fourth lens 840.

The first lens 810 may have positive refractive power, and may have a convex object-side surface and a convex image-side surface. The second lens 820 may have negative refractive power, and may have a concave object-side surface and a concave image-side surface. The third lens 830 may have positive refractive power, and may have a convex object-side surface and a convex image-side surface. The fourth lens 840 may have positive refractive power, and may have a convex object-side surface and a concave image-side surface.

The optical imaging system 800 may include the first prism P1, a filter 850, a second prism P2, and an image sensor 860.

The optical imaging system may include the first prism P1 as a mechanism for folding or refracting an optical path. The first prism P1 may fold light incident in a direction of a first optical axis C1 in a direction of a second optical axis C2. The second optical axis C2 refracted by the first prism P1 may be almost perpendicular to the first optical axis C1. The first prism P1 may be disposed on an object side of the first lens 810. The first prism P1 may refract light reflected from an object (a subject) to the second prism P2. The second prism P2 may refract the incident light to the image sensor 860.

The filter 850 may be disposed in front of the image sensor 860 and may block infrared rays, or the like, included in incident light. The image sensor 860 may include a plurality of optical sensors. The image sensor 860 may be configured to convert an optical signal into an electrical signal.

Table 15 lists characteristics of the lenses of the optical imaging system 800, and Table 16 lists aspherical values of the optical imaging system 800. FIG. 16 is aberration curves of the optical imaging system 800.

TABLE 15

| Surface No. | Note | Radius of Curvature | Thickness/ Gap | Focal Length | Refractive Index | Abbe Number |
|---|---|---|---|---|---|---|
| 1 | First | infinity | 1.5440 | | 1.6349 | 23.9 |
| 2 | Prism | infinity | 1.5440 | | 1.6349 | 23.9 |
| 3 | | infinity | 1.1194 | | | |
| 4* | First | 2.4810 | 1.2410 | 3.8330 | 1.535 | 56 |
| 5* | Lens | −10.0050 | 0.2107 | | | |
| 6* | Second | −5.9160 | 0.6414 | −2.8632 | 1.615 | 25.9 |
| 7* | Lens | 2.6450 | 0.3611 | | | |
| 8 | Third | 32.2310 | 0.7720 | 16.7347 | 1.6714 | 19.2 |
| 9* | Lens | −17.3760 | 0.0618 | | | |
| 10* | Fourth | 2.1070 | 0.5981 | 16.5768 | 1.615 | 25.9 |
| 11* | Lens | 2.3610 | 2.0000 | | | |
| 12 | Second | infinity | 1.5000 | | 1.6349 | 23.9 |
| 13 | Prism | infinity | 1.5000 | | 1.6349 | 23.9 |
| 14 | | infinity | 1.5000 | | | |
| 15* | Filter | infinity | 0.2100 | | 1.5441 | 56 |
| 16* | | infinity | 1.1618 | | | |
| 17 | Imaging Plane | infinity | 0.0016 | | | |

TABLE 16

| Surface No. | 4 | 5 | 6 | 7 | 8 | 9 | 10 | 11 |
|---|---|---|---|---|---|---|---|---|
| K | 0 | 0 | 0 | 0 | 0 | 0 | 0 | 0 |
| A | 1.152E−03 | 1.800E−02 | −1.140E−02 | −6.400E−02 | 2.640E−02 | −2.060E−02 | −1.250E−01 | −6.870E−02 |
| B | −1.430E−04 | −3.310E−03 | 1.750E−02 | 3.660E−02 | −2.660E−02 | −6.540E−03 | −1.100E−02 | −3.260E−02 |
| C | 1.364E−03 | 8.520E−04 | −3.006E−03 | −8.991E−03 | 7.106E−03 | −8.224E−03 | −6.192E−03 | 3.180E−02 |
| D | −1.596E−03 | 6.826E−04 | −8.678E−04 | −1.666E−03 | −3.650E−03 | 8.051E−03 | 1.406E−02 | −1.133E−02 |
| E | 9.084E−04 | −5.050E−06 | 1.867E−04 | −1.713E−03 | 2.892E−04 | −2.003E−03 | −4.630E−03 | 1.413E−03 |
| F | −2.456E−04 | −3.032E−04 | −3.580E−06 | 1.548E−03 | 0 | 0 | 0 | 0 |
| G | 2.600E−05 | 8.390E−05 | 1.610E−05 | −3.180E−04 | 0 | 0 | 0 | 0 |
| H | 0 | 0 | 0 | 0 | 0 | 0 | 0 | 0 |
| J | 0 | 0 | 0 | 0 | 0 | 0 | 0 | 0 |

Table 17 lists optical properties of the optical imaging system of the first to seventh examples.

TABLE 17

| Example | f | f-number | IMG_HT | FOV | 2θ | AL1 | BFL | TTL | PTTL |
|---|---|---|---|---|---|---|---|---|---|
| 1 | 9.70 | 2.80 | 2.04 | 23.48 | 91.15 | 7.285 | 5.285 | 9.760 | 12.510 |
| 2 | 9.70 | 2.80 | 2.04 | 23.34 | 91.15 | 7.285 | 4.789 | 9.568 | 12.318 |
| 3 | 9.70 | 2.80 | 2.04 | 23.32 | 91.15 | 7.285 | 4.756 | 9.520 | 12.271 |
| 4 | 9.71 | 2.80 | 2.04 | 23.30 | 91.15 | 7.285 | 4.710 | 9.500 | 12.251 |
| 5 | 9.71 | 2.80 | 2.04 | 23.36 | 91.15 | 7.285 | 4.645 | 9.500 | 12.251 |
| 6 | 9.66 | 2.80 | 2.04 | 23.28 | 91.15 | 7.371 | 5.683 | 9.569 | 12.233 |
| 7 | 9.50 | 2.80 | 2.04 | 23.66 | 91.15 | 7.371 | 5.373 | 9.821 | 12.484 |

Figure 19:
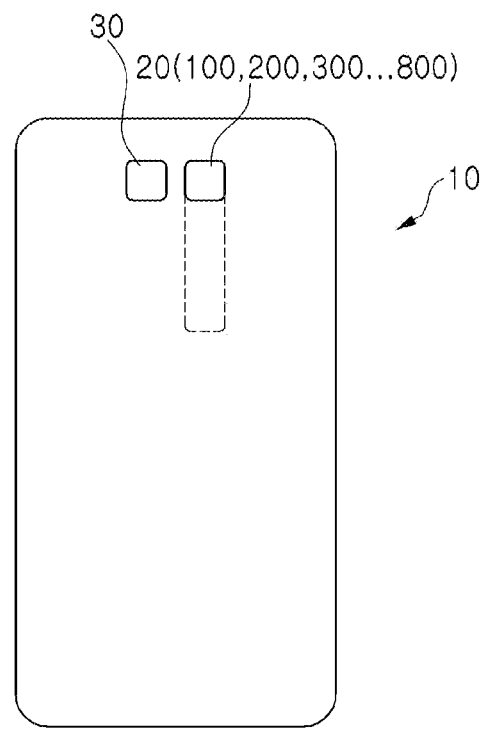
FIGS. 19, 20, 21, and 22 are rear side elevation diagrams illustrating a portable terminal device including an optical imaging system mounted thereon according to an example.

Table 18 lists a major-axis effective radius [mm] of the lenses of each example, and FIG. 19 lists a minor-axis effective radius [mm] of the lenses of each example.

TABLE 18

| Example | L1S1el | L1S2el | L2S1el | L2S2el | L3S1el | L3S2el | L4S1el | L4S2el |
|---|---|---|---|---|---|---|---|---|
| 1 | 1.690 | 1.494 | 1.433 | 1.168 | 1.200 | 1.042 | 1.020 | 1.037 |
| 2 | 1.690 | 1.470 | 1.411 | 1.141 | 1.200 | 1.050 | 1.020 | 1.081 |
| 3 | 1.690 | 1.470 | 1.412 | 1.142 | 1.200 | 1.054 | 1.020 | 1.075 |
| 4 | 1.690 | 1.472 | 1.413 | 1.149 | 1.200 | 1.061 | 1.020 | 1.125 |
| 5 | 1.690 | 1.487 | 1.427 | 1.172 | 1.200 | 1.087 | 1.020 | 1.150 |
| 6 | 1.700 | 1.533 | 1.488 | 1.251 | 1.221 | 1.246 | 1.205 | 1.200 |
| 7 | 1.700 | 1.553 | 1.473 | 1.270 | 1.241 | 1.259 | 1.220 | 1.200 |

TABLE 19

| Example | L1S1es | L1S2es | L2S1es | L2S2es | L3S1es | L3S2es | L4S1es | L4S2es |
|---|---|---|---|---|---|---|---|---|
| 1 | 1.183 | 1.046 | 1.003 | 0.818 | 0.840 | 0.730 | 0.714 | 0.726 |
| 2 | 1.183 | 1.029 | 0.988 | 0.799 | 0.840 | 0.735 | 0.714 | 0.756 |
| 3 | 1.183 | 1.029 | 0.988 | 0.800 | 0.840 | 0.738 | 0.714 | 0.753 |
| 4 | 1.183 | 1.031 | 0.989 | 0.805 | 0.840 | 0.743 | 0.714 | 0.787 |
| 5 | 1.183 | 1.041 | 0.999 | 0.821 | 0.840 | 0.761 | 0.714 | 0.805 |
| 6 | 1.190 | 1.073 | 1.042 | 0.876 | 0.854 | 0.872 | 0.843 | 0.840 |
| 7 | 1.190 | 1.087 | 1.031 | 0.889 | 0.869 | 0.881 | 0.854 | 0.840 |

Tables 20 to 22 list values of conditional equations of the optical imaging systems of the first to seventh examples. As indicated in Tables 20 to 22, the optical imaging systems of the first to seventh examples may satisfy the aforementioned conditional equations.

TABLE 20

| Conditional Equation | First Example | Second Example | Third Example | Fourth Example | Fifth Example | Sixth Example | Seventh Example | Eighth Example |
|---|---|---|---|---|---|---|---|---|
| L2R2/f | 0.1973 | 0.1912 | 0.2013 | 0.2274 | 0.2826 | 0.2738 | 0.2806 | 0.2738 |
| (L2R1 + L2R2)/(L2R1 − L2R2) | 0.8759 | 0.9611 | 0.9503 | 0.9673 | 0.9548 | 0.3821 | 0.9789 | 0.3821 |

TABLE 20-continued

| Conditional Equation | First Example | Second Example | Third Example | Fourth Example | Fifth Example | Sixth Example | Seventh Example | Eighth Example |
|---|---|---|---|---|---|---|---|---|
| L3R2/f | 0.8361 | −2.8842 | −1.0146 | −0.4894 | −0.2993 | −1.7987 | −0.9616 | −1.7987 |
| (L3R1 + L3R2)/(L3R1 − L3R2) | −6.4050 | −0.5376 | 0.1511 | 1.1243 | 2.2648 | 0.2995 | −7.2679 | 0.2995 |
| f/f1 | 2.3602 | 2.4830 | 2.5021 | 2.5135 | 2.5223 | 2.5202 | 2.1816 | 2.5202 |
| f/f2 | −3.3805 | −3.3190 | −3.1716 | −2.7795 | −2.2512 | −3.3738 | −2.2378 | −3.3738 |
| f/f3 | 0.3532 | 1.0074 | 1.1433 | 1.3125 | 1.5057 | 0.5772 | −0.1851 | 0.5772 |
| f/f4 | 1.0779 | −0.0294 | −0.3880 | −0.9710 | −1.6183 | 0.5827 | 0.7249 | 0.5827 |
| Nd1 − Nd2 | −0.0800 | −0.0800 | −0.0800 | −0.0800 | −0.0800 | −0.0800 | −0.0800 | −0.0800 |

TABLE 21

| Conditional Equation | First Example | Second Example | Third Example | Fourth Example | Fifth Example | Sixth Example | Seventh Example |
|---|---|---|---|---|---|---|---|
| L1S1es/L1S1el | 0.7000 | 0.7000 | 0.7000 | 0.7000 | 0.7000 | 0.7000 | 0.7000 |
| L1S2es/L1S2el | 0.7000 | 0.7000 | 0.7000 | 0.7000 | 0.7000 | 0.7000 | 0.7000 |
| L2S1es/L2S1el | 0.7000 | 0.7000 | 0.7000 | 0.7000 | 0.7000 | 0.7000 | 0.7000 |
| L2S2es/L2S2el | 0.7000 | 0.7000 | 0.7000 | 0.7000 | 0.7000 | 0.7000 | 0.7000 |
| DPL1 | 1.1326 | 1.1326 | 1.1326 | 1.1326 | 1.1326 | 1.1194 | 1.1194 |
| SPY2/SPX2 | 0.7000 | 0.7000 | 0.7000 | 0.7000 | 0.7000 | 0.7000 | 0.7000 |
| L1S1el/IMG_HT | 0.8284 | 0.8284 | 0.8284 | 0.8284 | 0.8284 | 0.8333 | 0.8333 |

TABLE 22

| Conditional Equation | First Example | Second Example | Third Example | Fourth Example | Fifth Example | Sixth Example | Seventh Example |
|---|---|---|---|---|---|---|---|
| L1S1el/PTTL | 0.1351 | 0.1372 | 0.1377 | 0.1380 | 0.1380 | 0.1390 | 0.1362 |
| L1S1es/PTTL | 0.0946 | 0.0960 | 0.0964 | 0.0966 | 0.0966 | 0.0973 | 0.0953 |
| L2S1el/PTTL | 0.1146 | 0.1146 | 0.1150 | 0.1154 | 0.1165 | 0.1217 | 0.1180 |
| L2S1es/PTTL | 0.0802 | 0.0802 | 0.0805 | 0.0807 | 0.0816 | 0.0852 | 0.0826 |
| AL1/(PTTL)$^2$ | 0.0465 | 0.0480 | 0.0484 | 0.0485 | 0.0485 | 0.0493 | 0.0473 |
| 2θ/FOV | 3.8819 | 3.9051 | 3.9085 | 3.9118 | 3.9018 | 3.9152 | 3.8523 |
| BFL/2IMG_HT | 1.2953 | 1.1737 | 1.1657 | 1.1545 | 1.1385 | 1.3930 | 1.3170 |

Figure 17:
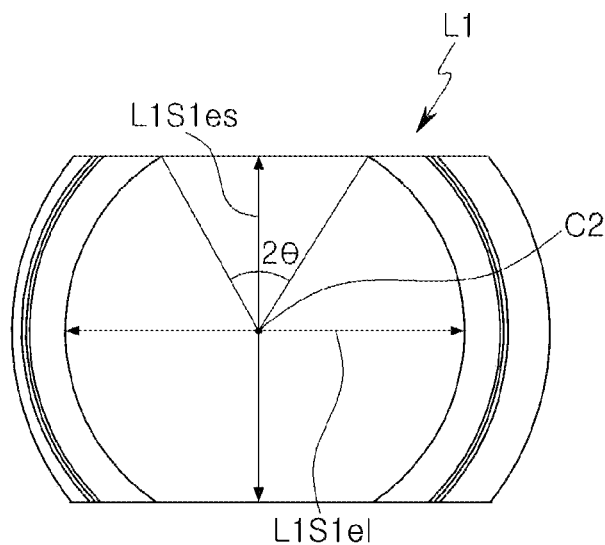
FIG. 17 is a plan diagram illustrating a first lens according to an example.
Figure 18:
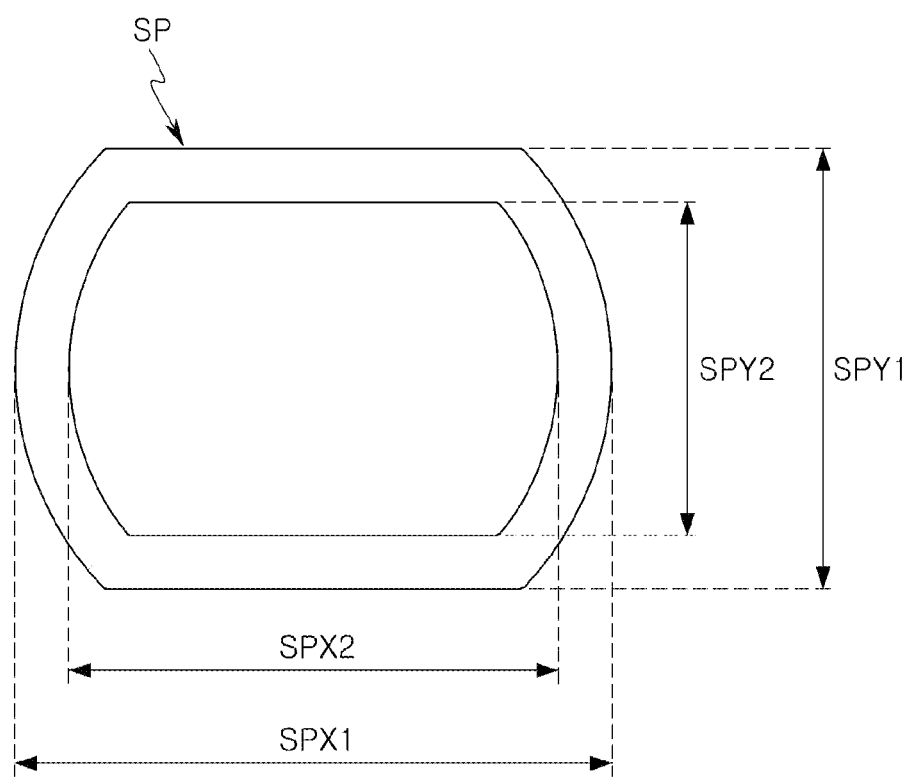
FIG. 18 is a plan diagram illustrating a gap maintaining member disposed between a first lens and a second lens of an optical imaging system according to an example.

The optical imaging system of the examples may include the lens and a gap maintaining member illustrated in FIGS. 17 and 18. FIG. 17 illustrates only the configuration of the first lens, but the second to fourth lenses may also be configured as in the example illustrated in FIG. 17.

Lengths of the first lens L1 in the first direction and the second direction, intersecting an optical axis, may be configured to be different from each other. For example, an effective radius (L1S1el; hereinafter, a major-axis effective radius) of the first lens L1 in the first direction may be greater than an effective radius (L1S1es; hereinafter, a minor-axis effective radius) in the second direction. One surface of the first lens L1 may be configured to be linear. For example, both side surfaces of the first lens L1 in parallel to the major-axis effective radius may be configured to be linear as illustrated in FIG. 17. A range of a size of the linear portion of the first lens L1 may be limited to a certain size. For example, an angle 2θ formed by an optical axis center C2 of the first lens L1 and both ends of the linear portion may be selected from a range of 80 to 92 degrees.

The gap maintaining member SP may be configured to be almost rectangular as illustrated in FIG. 18. For example, a length SPX1 of the gap maintaining member SP in the first direction may be greater than a length SPY1 in the second direction. A hole of the gap maintaining member SP may have a shape of an effective diameter of the lens, a shape the same as or similar to the shape of the effective diameter. The hole of the gap maintaining member SP in the example embodiment may be formed by a pair of linear lines parallel to each other and a pair of curved lines, as illustrated in FIG. 18. A length SPX2 of the hole of the gap maintaining member SP in the first direction may be greater than a length SPY2 in the second direction.

An optical imaging system 20 in the example may be mounted on a small-sized terminal device. For example, one or more of the optical imaging systems described in the aforementioned examples may be mounted on a rear surface or a front surface of a small-sized terminal device 10 as illustrated in FIGS. 19 to 22.

Figure 20:
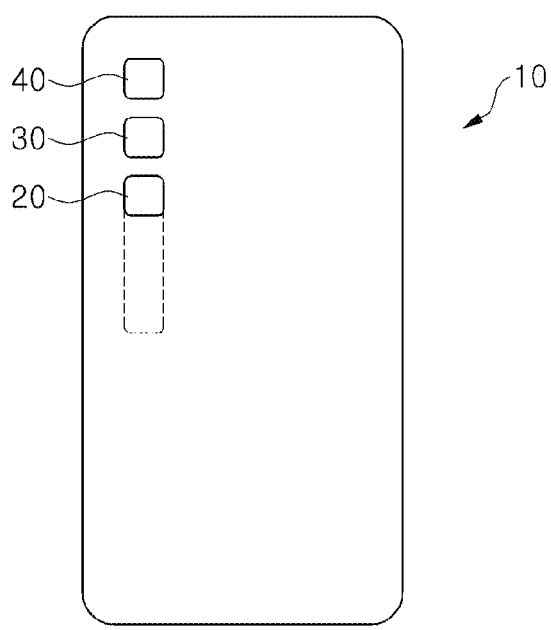
Figure 21:
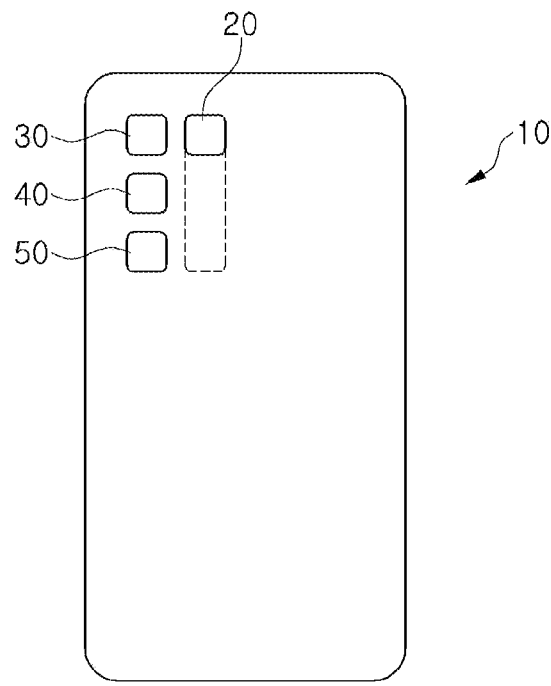
Figure 22:
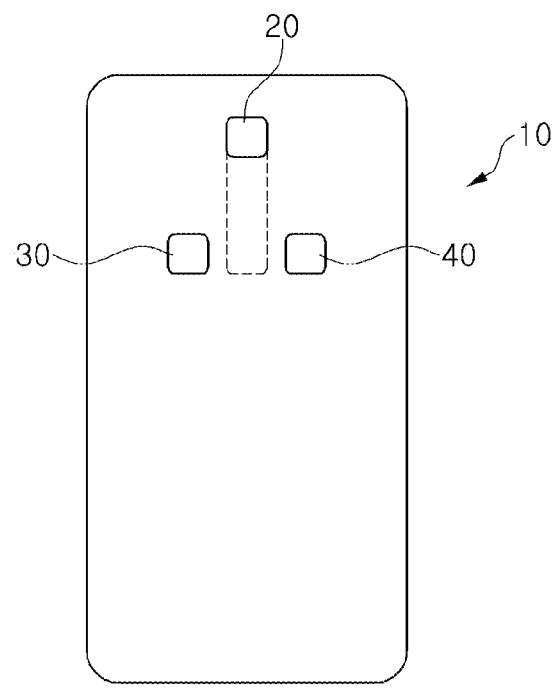

The small-sized terminal device 10 may include a plurality of optical imaging systems 20, 30, 40, and 50. As an example, the small-sized terminal device 10 may include the optical imaging system 20 for imaging an object at a long distance and the optical imaging system 30 for imaging an object at a short distance as illustrated in FIG. 19. As another example, the small-sized terminal device 10 may include the optical imaging system 20 for imaging an object in a long distance and the two optical imaging systems 30 and 40 for imaging an object in a short distance as illustrated in FIG. 20. As another example, the small-sized terminal device 10 may include the optical imaging system 20 for imaging an object in a long distance and the optical imaging systems 30, 40, and 50 having different focal lengths.

An arrangement form of the optical imaging systems 20, 30, 40, and 50 may be varied as illustrated in FIGS. 19 to 22.

According to the aforementioned examples, the optical imaging system which may have a relatively long focal length and may be mountable on a small-sized terminal device may be implemented.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
   a prism
   a first lens comprising positive refractive power;
   a second lens comprising negative refractive power;
   a third lens comprising positive refractive power; and
   a fourth lens comprising positive refractive power,
   wherein the prism and the first to fourth lenses are sequentially disposed in order from an object side to an image plane,
   wherein the optical imaging system has a total number of four lenses, and
   wherein $1.0 < PTTL/f < 2.0$, where PTTL is a distance from the reflective surface of the prism to the imaging plane and f is a focal length of the optical imaging system.

2. The optical imaging system of claim 1, wherein the first lens has a convex object-side surface.

3. The optical imaging system of claim 1, wherein the first lens has a convex image-side surface.

4. The optical imaging system of claim 1, wherein the second lens has a concave image-side surface.

5. The optical imaging system of claim 1, wherein the third lens has a convex object-side surface.

6. The optical imaging system of claim 1, wherein the fourth lens has a convex object-side surface.

7. The optical imaging system of claim 1, wherein the fourth lens has a concave image-side surface.

8. The optical imaging system of claim 1, wherein $0.10 < L2R2/f < 1.0$, where L2R2 is a radius of curvature of an image-side surface of the second lens.

9. The optical imaging system of claim 1, wherein $-5.0 < L3R2/f < 5.0$, where L3R2 is a radius of curvature of an image-side surface of the third lens.

10. The optical imaging system of claim 1, wherein $-10 < (L3R1+L3R2)/(L3R1-L3R2) < 10$, where L3R1 is a radius of curvature of an object-side surface of the third lens, and L3R2 is a radius of curvature of an image-side surface of the third lens.

11. The optical imaging system of claim 1, wherein $1.0 < f/f1 < 5.0$, where f1 is a focal length of the first lens.

12. The optical imaging system of claim 1, wherein $-5.0 < f/f2 < -1.0$, where f2 is a focal length of the second lens.

13. The optical imaging system of claim 1, wherein $-1.0 < f/f3 < 3.0$, where f3 is a focal length of the third lens.

14. The optical imaging system of claim 1, wherein $-5.0 < f/f4 < 5.0$, f4 is a focal length of the fourth lens.

15. The optical imaging system of claim 1, wherein $-1.0 < Nd1-Nd2 < 0$, where Nd1 is a refractive index of the first lens and Nd2 is a refractive index of the second lens.

16. An optical imaging system, comprising:
    a prism
    a first lens comprising positive refractive power;
    a second lens comprising a refractive power;
    a third lens comprising positive refractive power and convex image-side surface; and
    a fourth lens comprising positive refractive power,
    wherein the prism and the first to fourth lenses are sequentially disposed in order from an object side to an image plane,
    wherein the optical imaging system has a total number of four lenses, and
    wherein $1.0 < PTTL/f < 2.0$, where PTTL is a distance from the reflective surface of the prism to the imaging plane and f is a focal length of the optical imaging system.

* * * * *